(12) United States Patent
Blanche

(10) Patent No.: US 12,416,813 B1
(45) Date of Patent: Sep. 16, 2025

(54) WAVEGUIDE COMBINER WITH DYNAMIC GRATING ACTIVATION

(71) Applicant: Amazon Technologies, Inc., Seattle, WA (US)

(72) Inventor: Pierre-Alexandre Blanche, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 17/888,912

(22) Filed: Aug. 16, 2022

(51) Int. Cl.
*G02B 27/01* (2006.01)
*G02F 1/13* (2006.01)
*G02F 1/1334* (2006.01)

(52) U.S. Cl.
CPC ..... *G02B 27/0179* (2013.01); *G02B 27/0101* (2013.01); *G02F 1/1326* (2013.01); *G02F 1/1334* (2013.01); *G02B 2027/0187* (2013.01)

(58) Field of Classification Search
CPC ............ G02B 27/0179; G02B 27/0101; G02B 2027/0187; G02F 1/1326; G02F 1/1334
See application file for complete search history.

(56) References Cited

U.S. PATENT DOCUMENTS

| | | | |
|---|---|---|---|
| 9,494,799 | B2 | 11/2016 | Robbins et al. |
| 9,575,366 | B2 | 2/2017 | Srivastava et al. |
| 10,750,145 | B1 * | 8/2020 | Shipton ................ H04N 9/3105 |
| 11,333,893 | B1 | 5/2022 | Draper et al. |
| 2015/0309263 | A2 * | 10/2015 | Abovitz .................. G06F 3/011 |
| | | | 385/37 |
| 2018/0275350 | A1 | 9/2018 | Oh et al. |
| 2020/0158943 | A1 * | 5/2020 | Calafiore ............. G02B 6/0046 |
| 2022/0206295 | A1 | 6/2022 | Calafiore et al. |
| 2022/0207156 | A1 * | 6/2022 | Satpathy ................ G06F 21/602 |
| 2023/0176379 | A1 * | 6/2023 | Amirsolaimani .... G02B 6/0016 |
| | | | 359/630 |

(Continued)

FOREIGN PATENT DOCUMENTS

| | | | | |
|---|---|---|---|---|
| CN | | 217693558 U | * 10/2022 | |
| WO | WO-2023007477 | A2 | * 2/2023 | ........... G06F 16/955 |

OTHER PUBLICATIONS

Blanche, U.S. Appl. No. 17/992,131, "Waveguide Combiner With Multiple Image Planes," filed Nov. 22, 2022.

(Continued)

*Primary Examiner* — Jonathan Y Jung
(74) *Attorney, Agent, or Firm* — Kilpatrick Townsend & Stockton LLP

(57) ABSTRACT

A waveguide combiner with dynamic grating activation is described herein. In an example, an apparatus includes a first optical element that is configured to receive light. The apparatus also includes a substrate configured to propagate the light received by the first optical element along a propagation path within the substrate. The substrate includes an input surface and an output surface. The input surface is coupled to the first optical element. The apparatus also includes a second optical element coupled to the output surface and configured to output the light propagated along the propagation path. The second optical element includes a plurality of diffraction gratings at the output surface. Each one of the plurality of diffraction gratings has a corresponding controllable diffraction efficiency.

20 Claims, 13 Drawing Sheets

(56) References Cited

U.S. PATENT DOCUMENTS

2023/0176380 A1* 6/2023 He .................. G02B 6/3518
                                                    359/630
2023/0367833 A1* 11/2023 Kol .................. G06F 16/9566

OTHER PUBLICATIONS

Draper et al., "Examining Aberrations Due to Depth of Field in Holographic Pupil Replication Waveguide Systems," Applied Optics, vol. 60, No. 6, Feb. 20, 2021, pp. 1653-1659.

Bigler et al., "Holographic Waveguide HUD with in-line Pupil Expansion and 2D FOV Expansion," Applied Optics, vol. 58, Nov. 13, 2019, 11 pages.

Draper et al., "Holographic Curved Waveguide Combiner for HUD/AR with 1-D Pupil Expansion," Optics Express, vol. 30, No. 2, Jan. 11, 2022, pp. 2503-2516.

Draper et al., "Holographic Waveguide Head-up Display With 2-D Pupil Expansion and Longitudinal Image Magnification," Applied Optics, vol. 58, No. 5, Feb. 4, 2019, 15 pages.

Fan et al., "Switchable Liquid Crystal Grating With Sub Millisecond Response," Applied Physics Letters, vol. 100, No. 11, Mar. 12, 2012, pp. 111105-1-111105-4.

* cited by examiner

1300

WAVEGUIDE COMBINER WITH DYNAMIC GRATING ACTIVATION

BACKGROUND

Image displays, including near-eye displays, have been utilized in different mixed reality systems including, for instance, augmented reality systems and heads-up display systems. Typically, the resolution and field of view of the image, as well as the eyebox size, are system parameters of interest. Generally, a larger eyebox size can enable a larger viewing area for an end user or, said differently, more flexibility for a display area at which a user eye may look.

BRIEF DESCRIPTION OF THE DRAWINGS

Various embodiments in accordance with the present disclosure will be described with reference to the drawings, in which.

DETAILED DESCRIPTION

Figure 1:
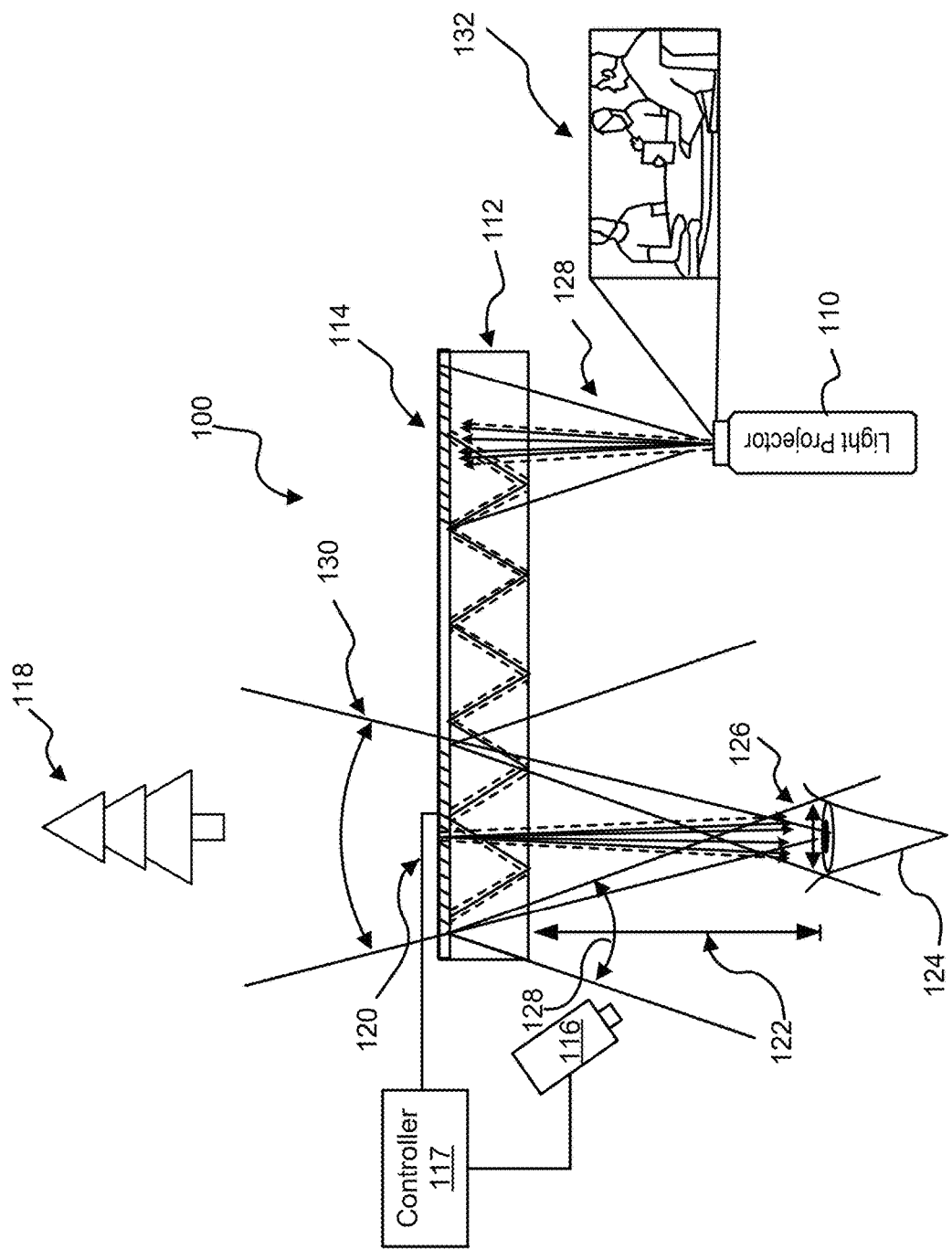
FIG. 1 illustrates a schematic of a system of an optical waveguide combiner with dynamic grating activation in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a waveguide combiner with dynamic grating activation. The waveguide combiner includes a first optical element that receives light from a light projector. This first optical element can be an in-coupling holographic optical element (HOE). The waveguide combiner also includes a substrate that is coupled to the first optical element and that propagates, along a propagation path within the substrate, the light received by the first optical element. The waveguide combiner also includes a second optical element that is coupled to an output surface of the substrate and that outputs, from the waveguide combiner, the light propagated along the propagation path. This second optical element can be an out-coupling HOE that includes multiple diffraction gratings.

Each of these diffraction gratings has a corresponding controllable diffraction efficiency. By controlling the diffraction efficiency of a diffraction grating, that diffraction grating can be activated to output at least a portion of the light or deactivated to prevent such light output. A controller may receive data indicating which diffraction grating(s) are to be activated. The controller can then apply different voltages to the diffraction gratings, including to the ones that are to be activated, to achieve a target diffraction efficiency per diffraction grating such that the light can be output from particular diffraction grating(s).

To illustrate, consider the example of a heads-up display in a vehicle. The heads-up display can be integrated in the vehicle's windshield and includes a light projector that emits light corresponding to image data (e.g., navigational data image) and waveguide combiner that combines this light with environmental light (e.g., from the outside environment received through the windshield). An eye tracking device of the heads-up display can track a viewer's pupil to determine a projected position of the pupil in an eyebox provided by an out-coupling HOE of the waveguide combiner. The eye tracking device can send data indicating the projected position to a controller of the heads-up display. Based on this data, the controller determines a diffraction grating of the outcoupling HOE corresponding to the pupil's projected position. The controller can then activate the diffraction grating to have about a 100% diffraction efficiency by applying a voltage to the diffraction grating, while deactivating the remaining diffraction gratings of the out-coupling HOE to have about a 0% diffraction efficiency. Thus, the waveguide combiner can output light at a position withing the eyebox corresponding to the projected position of the user's pupil.

Embodiments of the present disclosure provide several technical advantages. For example, the size of an eyebox can be increased by including multiple diffraction gratings within an out-coupling HOE. However, light can be spread out across these diffraction gratings resulting in an overall brightness reduction across the eyebox. One way to resolve the brightness reduction is to increase the light intensity, which can result in an increase to the power consumption of the light projector. Another way to resolve the brightness reduction is to use controllable diffraction gratings, where a subset of the diffraction gratings is activated and correspond to a pupil position within the eyebox. Doing so may avoid the need to increase the power consumption of the light projector. In other words, a large eyebox is possible, but the light is efficiently redirected to the eye without discarding any light. As a result, the luminance at an entrance pupil is conserved at the eyebox, which makes the system highly efficient as all the light is directed toward the eye rather than being distributed to other areas of the eyebox.

FIG. 1 illustrates a schematic of a system of an optical waveguide combiner 100 with dynamic grating activation in accordance with an embodiment of the present disclosure. The optical waveguide combiner 100 can be used in mixed reality display, such as a heads-up display or an augmented reality display, to extend an eyebox 126 by means of pupil replication. Pupil replication decouples the pupil size from the field of view, which are otherwise inversely linked in other types of mixed reality systems. This advantage means that the optical waveguide combiner based displays can offer a large eyebox together with a large image field of view.

Pupil replication in the optical waveguide combiner 100 can be obtained when the image that is propagating inside the optical waveguide combiner 100 is only partially extracted (or redirected) by a holographic optical element (HOE). When this happens, the remainder of the light keeps propagating in its original direction inside the optical waveguide combiner 100. The remaining light bounces on the outer surface of the optical waveguide combiner 100 and then interacts again with the holographic optical element, where another portion is extracted (or redirected). Successive extractions of the light replicates the pupil multiple times.

Pupil replication in the optical waveguide combiner 100 can greatly increases the size of the eyebox 126 of the display. However, the light intensity of a single pupil is reduced by the total number of replicated pupils. The luminance of the display at the output of the optical waveguide combiner 100 is equal to the luminance at the injection point divided by the number of replicated pupils. Since a high luminance is better for daylight applications for mixed reality displays, systems using pupil replication may need to have a powerful light source, which may be a problem for thermal management, size, and electrical power consumption. Therefore, there is a desire to increase the eyebox 126 without reducing the luminance of the display or increasing the electrical power consumption.

The optical waveguide combiner 100 can be built using waveguide holography. This technique uses an in-coupling holographic optical element 114 to trap auxiliary content 132 inside a substrate 112 through total internal reflection (TIR). The auxiliary content 132 can be generated by a light projector 110 (e.g., a light engine configured as a light source). In the substrate 112, the auxiliary content 132 propagates away from the light projector 110 and is out-coupled toward a viewer's eye 124 by an out-coupling holographic optical element 120. A holographic optical element represents a functional diffractive structure that transforms the waveform of the input beam into an output beam. A volume holographic element (VHOE) is a type of holographic optical element that operates in the Bragg diffraction regime. The optical waveguide combiner 100 represents the optical system that includes all the optical elements in the optical path from the exit aperture of the light projector 110 to the plane where light enters the viewer's eye 124. Both the in-coupling holographic optical element 114 and the out-coupling holographic optical element 120 are transparent across the entire visible range except for a percent reduction (depending on different parameters such as the type materials used, thickness, etc.) in transmission across the bandwidth of the broadband red-green-blue (RGB) light sources. This allows the viewer to see real imagery 118 and the auxiliary content 132. The light projector 110 and the out-coupling holographic optical element 120 emit within a cone of light 128.

Although FIG. 1 illustrate the in-coupling holographic optical element 114 and the out-coupling holographic optical element 120 to be on a same side of the substrate 112, embodiments of the present disclosure are not limited as such. For instance, the in-coupling holographic optical element 114 and the out-coupling holographic optical element 120 to be on opposite sides of the substrate 112. Generally, the in-coupling holographic optical element 114 is coupled to an input surface of the substrate 112 by, for instance, being mounted to and attached to the input surface.

Likewise, the out-coupling holographic optical element 120 is coupled to an output surface of the substrate 112 by, for instance, being mounted to and attached to the output surface. The input surface corresponds to a surface where light from the light projector 110 is received. The output surface corresponds to a surface from which light is emitted from the substrate 112.

The out-coupling holographic optical element 120 can include multiple diffraction gratings that can be individually activated by a controller 117 based on a pupil location of the viewer's eye 124. An eye tracking device 116 can generate data indicating the pupil location that can be sent to the controller 117 for activating one or more diffraction gratings. The controller 117 can be electrically coupled with the eye tracking device 116 to receive therefrom the data. The controller 117 can also be electrically coupled with the out-coupling holographic optical element 120 to control the diffraction efficiencies of diffraction gratings of the out-coupling holographic optical element 120. In an example, the diffraction efficiency control of each diffraction grating can be via voltage applied to the diffraction grating. In this case, the controller 117 electrical coupling to the out-coupling holographic optical element 120 can be indirect. For instance, the controller 117 can control a voltage source (e.g., via a set of switches) to apply a target voltage per diffraction grating. By applying a voltage using the controller 117, liquid crystal molecules of the diffraction gratings align so the perceived index of refraction becomes identical to the host material, thereby changing the index modulation and the resulting diffraction efficiency. When the voltage is switched off, the liquid crystal molecules become randomly oriented, and the perceived index of refraction changes from that of the host material. The index modulation increases as does the diffraction efficiency. Note that depending on the materials used, the opposite controls can be possible: the diffraction appears when the voltage is switched on and disappears when switched off. Further, depending on the materials used, any diffraction efficiency can be achieved within a range (e.g., between 0% and 100%) by controlling the voltage. For instance, at a first voltage (e.g., 3V), a 50% diffraction efficiency may be possible, whereas at a second voltage (e.g., 5V), a 100% diffraction efficiency may be possible.

The eye tracking device 116 can detect either a multi-dimensional gaze of the viewer's eye 124 (e.g., two-dimensional along an X-Y plane, or three-dimensional corresponding to an X, Y, Z coordinate in space). In an example, the eye tracking device 116 can include light emitting diodes or other illumination sources for illuminating the viewer's eye 124. The light emitting diodes may emit light in the infrared frequency band, or in the near infrared frequency band. The eye tracking device 116 can also include an image sensor for capturing images of the viewer's eye 124. The image sensor may be a camera, such as a complementary metal oxide semiconductor (CMOS) camera or a charged coupled device (CCD) camera with either a rolling shutter mechanism or a global shutter mechanism. The camera is not limited to be an IR camera or a depth camera or a light-field camera.

A first illumination source can be positioned with respect to the image sensor so that the image sensor may capture bright pupil images of the viewer's eye 124. As an example, the first illumination source may be positioned coaxially with the image sensor so that light reflected from the retina of the viewer's eye 124 returns back through the pupil towards the image sensor, causing the pupil to appear brighter than the iris surrounding it in images where the first illumination source illuminates the viewer's eye 124. A second illumination source can also be positioned with respect to the image sensor for capturing dark pupil images. For example, the second illumination source may be arranged non-coaxially with (or further away from) the image sensor. In this arrangement, light that is reflected from the retina of the viewer's eye 124 does not reach the image sensor, so the pupil appears darker than the iris surrounding it in images where the second illumination source illuminates the viewer's eye 124. The first illumination source and the second illumination source may alternate turns to illuminate the viewer's eye for each image.

The eye tracking device 116 can also include computing components for processing the images captured by the image sensor. For example, the computing components may be a circuitry that includes one or more processors for executing image processing algorithms. The circuitry may be in communication with the image sensor and the illumination sources via a wired or a wireless connection. For each image, the circuitry may perform image processing for extracting features in the image. For example, the circuitry may execute pupil center cornea reflection eye tracking to determine where the viewer's eye is looking. In pupil center cornea reflection eye tracking, the circuitry can estimate the position of the center of the pupil and the position of the center of a glint caused by reflection of light from the illumination sources at the viewer's eye 124. The circuitry can calculate where the viewer is in space using the glint and where the viewer's eye 124 is pointing using the pupil.

The eye tracking device 116 may be placed next to or below a display viewed by the viewer in an area outside of the eyebox 126, or in any other suitable location relative to the viewer. In an example, the eye tracking device 116 may be part of a heads-up display on a windshield of a vehicle, so the eye tracking device 116 may be positioned so as not to interfere with the field of view of the viewer. It will be appreciated that any number of illumination sources and image sensors may be used for eye tracking, and that such illumination sources and image sensors may be distributed in many different ways relative to displays watched by the viewer.

By using switchable diffraction gratings, it is possible to selectively activate sections of the out-coupling holographic optical element 120, where these sections extract (or redirect) the image propagating inside the optical waveguide combiner 100 (where the image is represented by the light emitted by the light projector 120). Also, by using with the eye tracking device 116, it may be possible to know where the viewer's pupil is located in real time. Knowing the user pupil location, it is possible to activate only the diffraction grating section(s) that redirect the image directly to the viewer's eye 124. By activating only the portion of the grating that sends the light toward the viewer's eye 124, a large eye box can be maintained, but the light is efficiently redirected to the viewer's eye 124 without discarding any light.

The optical waveguide combiner 100 can form the eyebox 126 in the horizontal and vertical directions. The eyebox 126 can correspond to the vertical and horizontal distance where the viewer's pupil receives all the angles emitted by the light projector 110. A large eye box is desirable for accommodating eye movement, physical variation among viewers, and mechanical tolerances. As the viewer's pupil moves outside the eyebox 126, the image becomes degraded. Eye relief 122 is the distance between the substrate surface and the entrance pupil of the viewer's eye 124. For maximum comfort, this distance should be larger than a minimum threshold distance. The field-of-view (FOV) 130 is the angular size of the image determined by the geometric relationship between the size of the out-coupling holographic optical element 120 and the distance between the pupil and the surface of the out-coupling holographic optical element 120.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of incoupling into substrate modes (light propagating through total internal reflection).

A properly designed waveguide combiner 100 can have a high transmission (e.g., at least 80%) of the light from the real imagery 118, a large auxiliary field of view diagonally, vertically and horizontally, a large eye box, and an ability to accept the auxiliary content 132 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical waveguide combiner 100 maintains the white balance of the light projector 110 along the optical path to the viewer's eye 124.

While either transmission or reflection holographic optical element can be implemented in the display to produce a large field of view, reflection holographic optical elements can provide a large horizontal field of view. Transmission holographic optical elements can be used in the optical waveguide combiner 100 when the angular requirements on the field of views are smaller. Both horizontal and vertical field of views can be limited by the distance from the aperture stop of the light projector 110 to the center of the out-coupling holographic optical element 120. In order for NTE glasses to accommodate size, weight, and power restrictions, the size of the light projector 110 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the waveguide combiner 100. This is because the light forming the image experiences multiple bounces in the direction of the out-coupling holographic optical element 120 and multiple light extractions can expand the eyebox. In particular, a portion of the light can be extracted and output by each of the diffraction gratings of the out-coupling holographic optical element 120.

Figure 2:
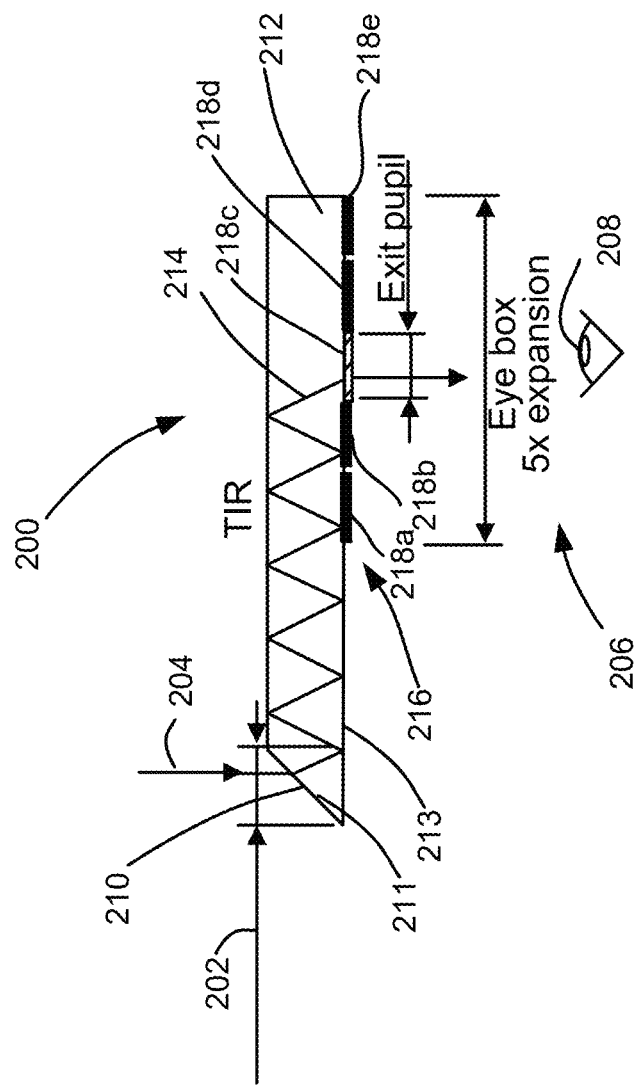
FIG. 2 illustrates an example of an optical waveguide combiner with dynamic grating activation in accordance with an embodiment of the disclosure.

FIG. 2 illustrates an example of an optical waveguide combiner 200 with dynamic grating activation in accordance with an embodiment of the disclosure. The optical waveguide combiner 200 is an example of the waveguide combiner 100 of FIG. 1 and includes a first optical element 210, a substrate 212, and a second optical element 216. The first optical element 210 can receive light 204 emitted by a light source (e.g., light projector 10 in FIG. 1). The light source may be a light projector. As an example, the first optical element 210 may be an in-coupling holographic optical element. The substrate 212 can be transparent and propagate the light 204 received by the first optical element 210 along a propagation path 214 within the substrate 212. The substrate 212 can include an input surface 211 that is coupled to the first optical element 210. Once the light enters the substrate 212, the light is propagated along the propagation path 214 within the substrate 212 by total internal reflection (TIR). The substrate 212 can also include an output surface 213 that is coupled to the second optical element 216. The second optical element 216 may be an out-coupling holographic optical element.

In an example, the second optical element 216 can output the light 204 propagated along the propagation path 214. To output the light 204, the second optical element 216 can include diffraction gratings 218a-e that form an eyebox 206 at the output surface 213. As used herein, a diffraction grating can be a diffraction grating section or a diffraction grating structure that includes a plurality of diffractive elements, such as grating teeth or diffractive features formed using a metamaterial. In an example, a liquid crystal material is used to form the diffractive elements. Each of the diffraction gratings 218a-e can have a controllable diffraction efficiency. That is, the diffraction efficiency of diffraction grating 218a may be the same as or different from the diffraction efficiency(ies) of the diffraction gratings 218b-e. The diffraction efficiency of each of the diffraction gratings 218a-e may be controlled by a controller (e.g., controller 117 in FIG. 1) that applies a voltage to each one of diffraction gratings 218a-e to achieve a target diffraction efficiency per diffraction grating. So, the controller may apply a first voltage to the diffraction grating 218a to achieve a first diffraction efficiency for the diffraction grating 218a and a second voltage to the diffraction grating 218c to achieve a second diffraction efficiency for the diffraction grating 218c. If no voltage is applied to a diffraction grating (e.g., a 0V is applied), that diffraction grating may be considered to be inactive (or deactivated) and its diffraction efficiency can be 0%. Upon the application of a voltage to a diffraction grating, that diffraction grating can be considered to be activated and its diffraction efficiency can depend on the applied voltage (e.g., be strictly larger than 0% and all the way up to about 100%, depending the applied voltage). Although FIG. 2 illustrates five diffraction gratings, a different number of diffraction gratings is possible (e.g., at least two and possibly in the hundreds or thousands). Further, although the diffraction gratings are illustrated as being installed along a same direction (e.g., in the X-direction), a different direction and/or a grid installation along different directions are possible.

The controller can selectively activate the diffraction gratings 218a-e based on a position of a pupil 208 in the eyebox 206. The controller can receive data generated by an eye tracking device (e.g., eye tracking device 116 in FIG. 1) that indicates the position of the pupil 208 in the eyebox 206. The controller can then determine which of the diffraction gratings 218a-e corresponds to the position of the pupil 208 and activate the corresponding diffraction grating. For instance, as illustrated, the diffraction grating 218c is activated, which means the position of the pupil 208 corresponds to the diffraction grating 218c. So, the controller activates the diffraction grating 218c by applying a voltage to the diffraction grating 218c. Upon activating the corresponding diffraction grating, at least a portion of the light 204 can be output by the corresponding diffraction grating. That is, once the controller applies the voltage to activate the diffraction grating 218c, at least a portion of the light 204 can be output by the diffraction grating 218c. The other diffraction gratings can remain inactive and not output a portion of the light 204. At any given time, the eyebox 206 is approximately equal to an entrance pupil 202 of the optical waveguide combiner 200. Thus, the luminance at the entrance pupil 202 is conserved at the eyebox 206. This make the system highly efficient as all the light 204 is directed toward the viewer's eye.

If the position of the pupil 208 changes at some later point in time, the controller can receive additional data indicating the updated position of the pupil 208. The controller can determine a different diffraction grating 218 that is associated with the updated position and activate the different diffraction grating 218 while de-activating the diffraction grating 218c by removing the voltage applied to the diffraction grating 218c and applying a voltage to the different diffraction grating 218.

In an example, each diffraction grating is implemented as a liquid crystal grating. Without any voltage, the liquid crystal molecules are randomly oriented and there is no index of refraction modulation inside the diffraction grating 218. In this case, the diffraction grating 218 does not diffract the light 204 which continues to propagation inside the substrate 212. Once a voltage is applied, an electric field is generated across the thickness of the diffraction grating 218 that orients the liquid crystal molecules. This orientation induces an index of refraction modulation, the diffraction grating becomes active and diffracts the light 204. The applied voltage can be used to make sure the same amount of light is sent to each eye of the viewer. This can balance the intensity of the image perceived by the left and right eye of the viewer.

Figure 3:
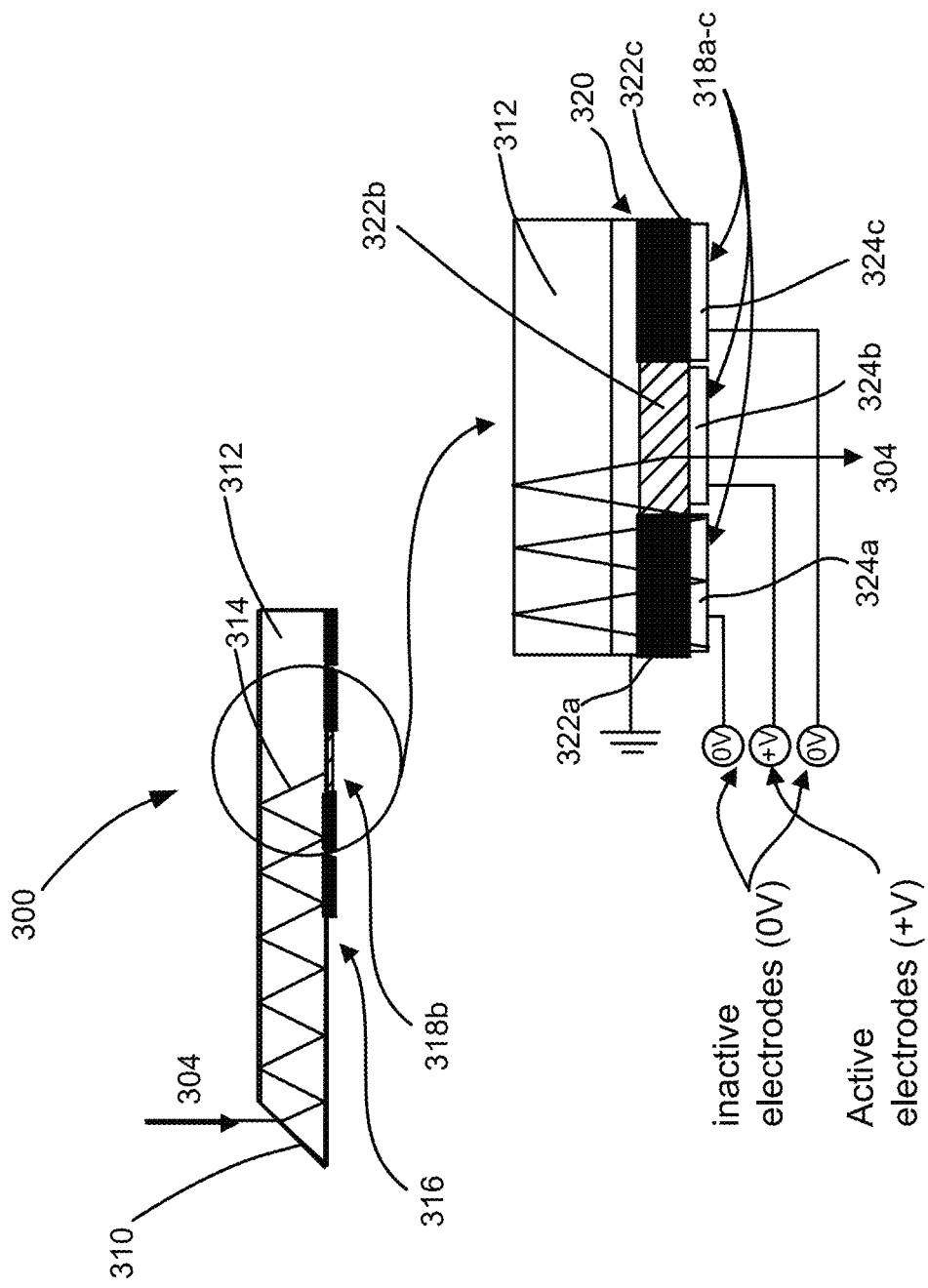
FIG. 3 illustrates an example of components of diffraction gratings of an optical waveguide combiner in accordance with an embodiment of the present disclosure.

FIG. 3 illustrates an example of components of diffraction gratings 318 of an optical waveguide combiner 300 in accordance with an embodiment of the present disclosure. The optical waveguide combiner 300 includes a first optical element 310, a substrate 312, and a second optical element 316. The first optical element 310 can receive light 304 emitted by a light source (e.g., light projector 110 in FIG. 1). The light source may be a light projector. As an example, the first optical element 310 may be an in-coupling holographic optical element. The substrate 312 can be transparent and propagate the light 304 received by the first optical element 310 along a propagation path 314 within the substrate 312. The substrate 312 can include an input surface that is coupled to the first optical element 310 and an output surface that is coupled to the second optical element 316.

In an example, the second optical element 316 can output the light 304 propagated along the propagation path 314. To output the light 304, the second optical element 316 can include diffraction gratings 318 that form an eyebox at the output surface.

In an example, each of the diffraction gratings 318 is a liquid crystal diffraction grating. Liquid crystal molecules in the liquid crystal diffraction gratings can be polarized to achieve a particular diffraction grating structure that has a particular diffraction efficiency.

In an example, a liquid crystal diffraction grating can be formed by using polymer dispersed liquid crystal molecules disposed in a cell 322 that can be polarized (e.g., liquid crystal molecules dispensed in a polymer contained in a glass structure). For the polarization, a first electrically conductive layer and a second electrically conductive layer are attached to opposite sides of the cell 322 (e.g., by being disposed on opposite glass layers between which the polymer containing the liquid crystal molecules is disposed). The first electrically conductive layer can be a ground electrode 320 that is electrically coupled to a voltage ground, whereas the second electrically conductive layer can be a polarizing electrode 324. The ground electrode 320 can be optically transparent (where this transparency is defined in the human visible wavelength range) such as by being made out of an indium tin oxide layer. Likewise, the polarizing electrode 324 can be optically transparent such as being made out of an indium tin oxide layer.

As such, each diffraction gratings 318 can be a liquid crystal diffraction grating that includes a cell 322, a common ground electrode 320 and a polarizing electrode 324, where the ground electrode 320 and the polarizing electrode 324 are disposed on opposite sides of the cell 322 (e.g., by being deposited as indium tin oxide layers on glass surfaces of the cell 322). The diffraction gratings 318 may share a common ground electrode 320, or each diffraction grating 318 may be coupled to an independent ground electrode (having a structure similar to the common ground electrode 320). For the common ground electrode 320, each diffraction grating 318 can be coupled to a portion of the ground electrode 320. That is, the diffraction grating 318a can be coupled to a first portion of the ground electrode 320, the diffraction grating 318b can be coupled to a second portion of the ground electrode 320, and the diffraction grating 318c can be coupled to a third portion of the ground electrode 320. Regardless of whether a common ground electrode 320 is shared or not, the diffraction gratings 318 do not share a polarizing electrode 324. Instead, each of the diffraction gratings 318 has its own polarizing electrode 324.

Figure 7:
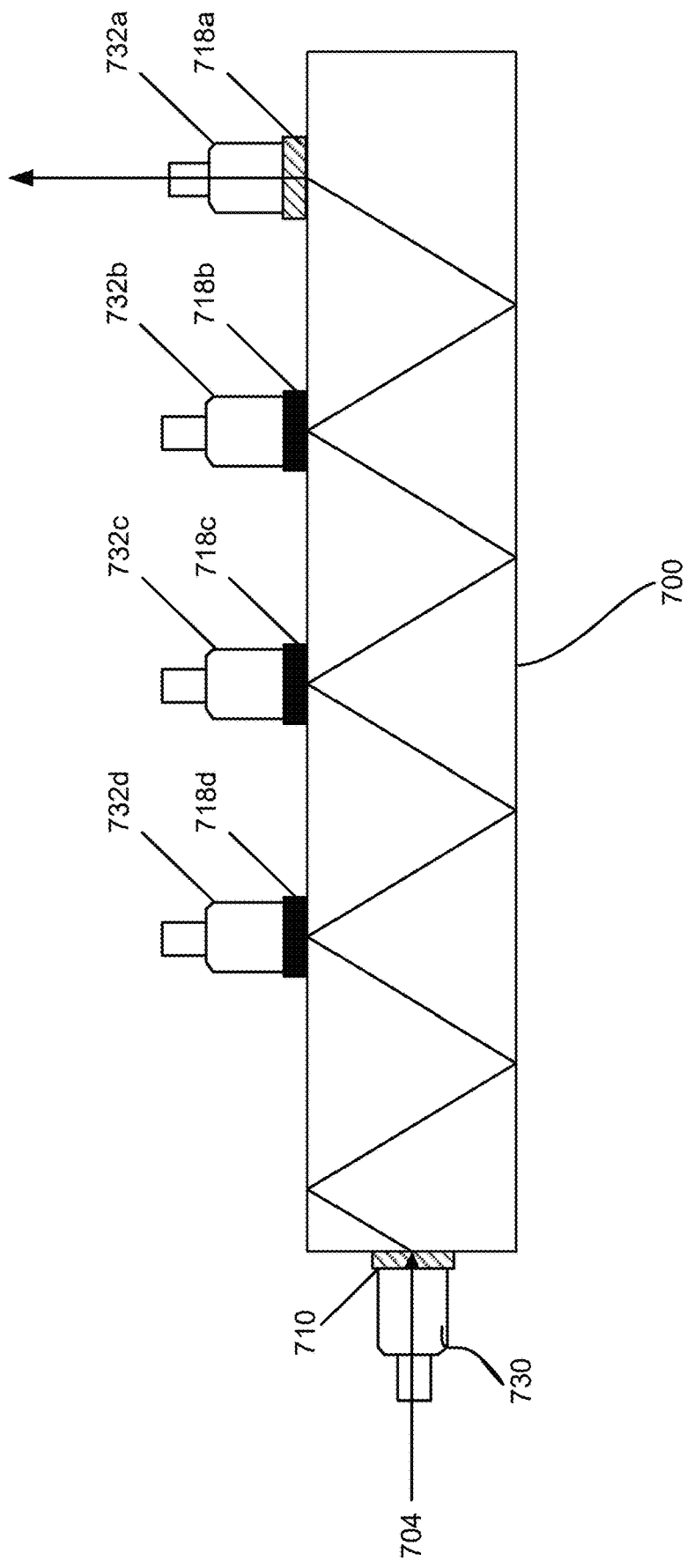
FIG. 7 illustrates an example of dynamic grating activation for a photonic switch waveguide combiner in accordance with an embodiment of the present disclosure.

The illustration of FIG. 7 shows the common ground electrode implementation. In particular, three diffraction gratings are illustrated. The first diffraction grating 318a includes a first portion of the common ground electrode 320, a cell 322a, and a polarizing electrode 324a.

Likewise, the second diffraction grating 318b includes a second portion of the common ground electrode 320, a cell 322b, and a polarizing electrode 324b. In addition, the third diffraction grating 318c includes a third portion of the common ground electrode 320, a cell 322c, and a polarizing electrode 324c.

Each polarizing electrode 324 can be electrically coupled to a voltage source (or the different polarizing electrodes can be coupled to the same voltage source via corresponding switches), so each of the diffraction gratings 318 can have a controllable diffraction efficiency by controlling the voltage applied to its polarizing electrode. That is, the diffraction efficiency of diffraction grating 318a may be the same as or different from the diffraction efficiency(ies) of the diffraction gratings 318b-c. The diffraction efficiency of each of the diffraction gratings 318a-c may be controlled by a controller (e.g., controller 117 in FIG. 1) that applies voltage from the voltage source to the diffraction gratings 318a-c. So, the controller may apply a first voltage to the diffraction grating 318a to achieve a first diffraction efficiency for the diffraction grating 318a and a second voltage to the diffraction grating 318c to achieve a second diffraction efficiency for the diffraction grating 318c. If no voltage is applied to a diffraction grating, that diffraction grating may be considered to be inactive. Upon the application of a voltage to a diffraction grating, that diffraction grating can be considered to be activated.

Different configurations of the cells 322 are also possible. In one example, a common cell is used across the diffraction gratings 318. In this example, a diffraction grating 318 includes a ground electrode (or a portion of a common ground electrode 320), a portion of the common cell, and a corresponding polarizing electrode 324. In another example, a cell is used per diffraction grating. In this example, a diffraction grating 318 includes a ground electrode (or portion of a common ground electrode 320), a corresponding cell 322, and a corresponding polarizing electrode 324.

The controller can selectively activate the diffraction gratings 318a-c based on a position of a pupil in an eyebox. The controller can receive data generated by an eye tracking device (e.g., eye tracking device 116 in FIG. 1) that indicates the position of the pupil in the eyebox. The controller can then determine which of the diffraction gratings 318a-c corresponds to the position of the pupil and activate the corresponding diffraction grating. For instance, as illustrated, the diffraction grating 318b is activated, which means the position of the pupil (not shown) corresponds to the diffraction grating 318b. So, the controller activates the diffraction grating 318b by applying a voltage to the diffraction grating 318b (e.g., to the corresponding polarizing electrode 324b). Upon activating the corresponding diffraction grating, at least a portion of the light 304 can be output by the corresponding diffraction grating. That is, once the controller applies the voltage to activate the diffraction grating 318b, at least a portion of the light 304 can be output by the diffraction grating 318b. The other diffraction gratings can remain inactive and not output a portion of the light 304. The modulation of the voltage to change the diffraction efficiency can also be used in the case where the desired extraction pupil is larger than a single active polarizing electrode. In this case, multiple polarizing electrodes 324 can be activated to increase the size of the extraction pupil.

Although FIG. 3 illustrates a particular arrange of a cell disposed between two electrodes, other arrangements be possible. For instance, a polarizing electrode may be mechanically coupled to the substrate 312. A cell may be then sandwiched between the polarizing electrode and a common electrode, where the common electrode is on an external surface of the waveguide combiner.

Figure 4:
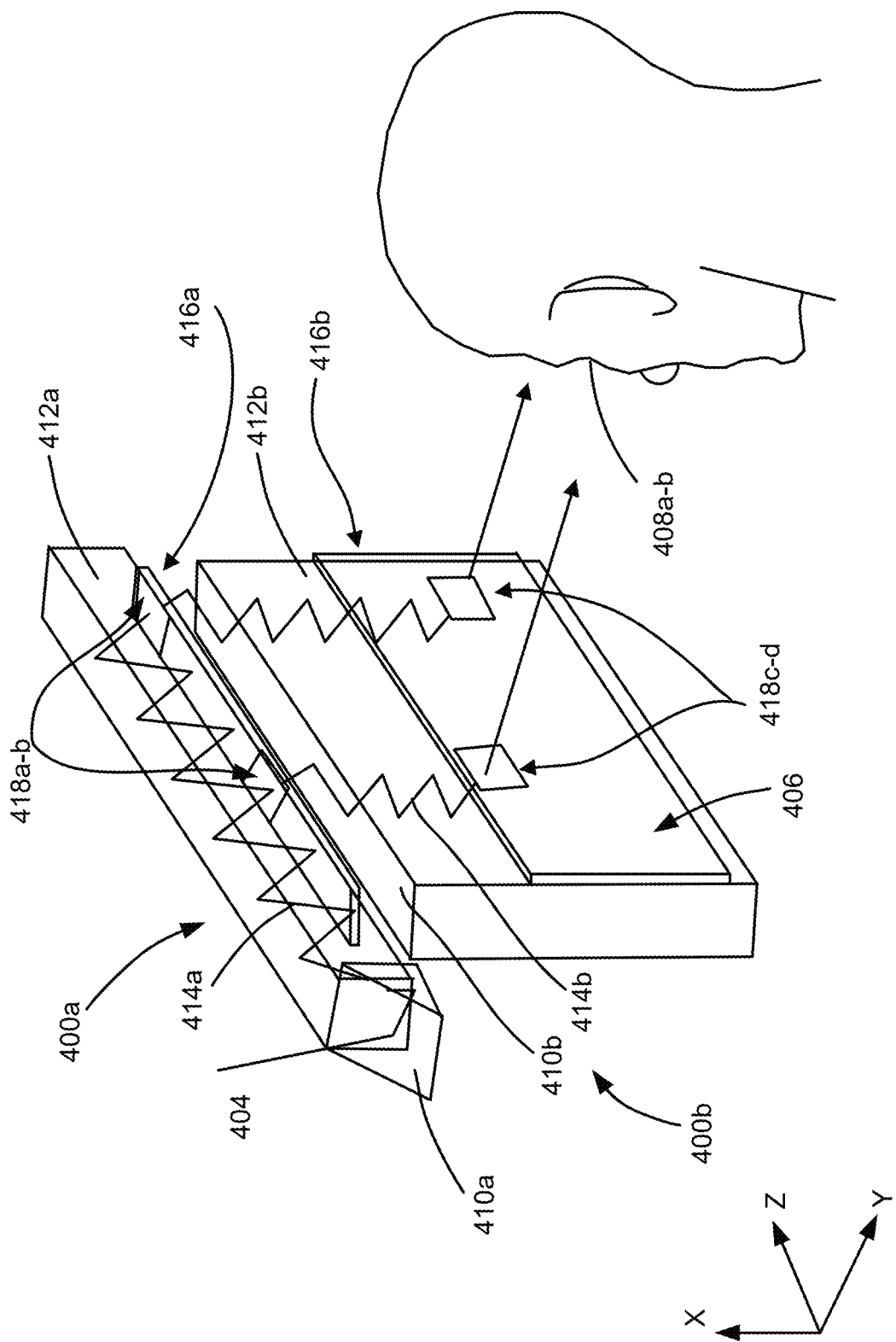
FIG. 4 illustrates an example of dynamic grating activation for two waveguide combiners for two-dimensional pupil relocation in accordance with an embodiment of the present disclosure.

FIG. 4 illustrates an example of dynamic grating activation for two optical waveguide combiners 400 for two-dimensional pupil relocation in accordance with an embodiment of the present disclosure. The optical waveguide combiner 400a includes a first optical element 410a, a substrate 412a, and a second optical element 416a. The first optical element 410a can receive light 404 emitted by a light source (e.g., light projector 10 in FIG. 1). As an example, the first optical element 410a may be an in-coupling holographic optical element. The substrate 412a can be transparent and propagate the light 404 received by the first optical element 410a along a propagation path 414a within the substrate 412a. The substrate 412a can include an input surface that is coupled to the first optical element 410a and an output surface that is coupled to the second optical element 416a.

In an example, the second optical element 416a can output the light 404 propagated along the propagation path 414a to the second optical waveguide combiner 400b. To output the light 404, the second optical element 416a can include diffraction gratings 418. The diffraction gratings 418 can be controllably activated based on a position of one or more pupils 408 in an eyebox 406. An eye tracking device (e.g., eye tracking device 16 in FIG. 1) can determine the position of the pupil 408 and a controller (e.g., controller 117 in FIG. 1) can activate the diffraction gratings 418a-b that are associated with the position. The diffraction grating 418a may be activated based on a position of a first pupil 408a in the eyebox 406 and the diffraction grating 418b may be activated based on a position of a second pupil 408b in the eyebox 406.

Note that given the multi-dimension pupil replication, the pupil position of the first pupil 408a is within the eyebox 406 formed by the second waveguide combiner 400b. As further described herein below, a diffraction grating of the second waveguide combiner 400b at the pupil position is activated. Nonetheless, the diffraction grating 418a of the first waveguide combiner 400a is also activated. Although this diffraction grating 418a does not directly corresponds to the pupil position within the eyebox 406, it directly corresponds to the light propagation to the to be-activated diffraction grating of the second waveguide combiner 400b and, thus, indirectly corresponds to the pupil position. As such, for each pupil position within the eyebox 406, the controller can store two diffraction grating associations: a first association for a diffraction grating of the second waveguide combiner 400b directly corresponding to the pupil position and a second association for a diffraction grating of the first waveguide combiner 400a indirectly corresponding to the pupil position. Given a detected pupil position within the eyebox, the controller can look up the associations and determine the diffraction grating within each of the first and second waveguide combiners 400a-b that need to be activated.

Different voltages may be applied to the diffraction gratings 418a-b to achieve different diffraction efficiencies for the diffraction gratings 418a-b. A diffraction grating that is positioned closer to the first optical element 410a may be activated to have a smaller diffraction efficiency than a diffraction grating that is further from the first optical element 410a. For example, a first voltage may be applied to the diffraction grating 418a to achieve a diffraction efficiency of 50% for the diffraction grating 418a and a second voltage may be applied to the diffraction grating 418b to achieve a diffraction efficiency of 100% for the diffraction grating 418b. So, 50% of the light 404 can be diffracted into the second optical waveguide combiner 400b by the diffraction grating 418a, then the remaining 50% of light 404 can continue propagating in the substrate 412a along the propagation path 414a until the diffraction grating 418b diffracts 100% of the remaining light.

The second optical element 416a can redirect the light 404 in a first direction (e.g., the Y-direction in FIG. 4) and the diffraction gratings 418a-b of the second optical element 416a can be coupled to a third optical element 410b of the second optical waveguide combiner 400b along the first direction. As an example, the third optical element 410b may be an in-coupling holographic optical element. The second optical waveguide combiner 400b also includes a substrate 412b and a fourth optical element 416b. The substrate 412b can be transparent and propagate the light 404 received by the third optical element 410b along a propagation path 414b within the substrate 412b. The substrate 412b can include an input surface that is coupled to the third optical element 410b and an output surface that is coupled to the fourth optical element 416b.

In an example, the second optical element 416a can output the light 404 propagated along the propagation path 414a to a viewer. The fourth optical element 416b can redirect the light 404 in a second direction (e.g., the X-direction in FIG. 4). To output the light 404, the fourth optical element 416b can include diffraction gratings 418. The diffraction gratings 418 can be controllably activated based on the position of the pupils 408a-b in the eyebox 406. As illustrated, diffraction gratings 418c-d are activated based on the position of the pupils 408a-b. Different voltages may be applied to the diffraction gratings 418c-d to achieve different diffraction efficiencies for the diffraction gratings 418c-d. Or so that an entirety of the light 404 is output to the viewer, a same voltage may be applied to each of the diffraction gratings 418c-d to achieve a diffraction efficiency of 100%.

Although FIG. 4 illustrates two optical waveguide combiners being used to output light at ninety degrees with respect to each other, it is noted that the optical waveguide combiners may redirect light at different angles. In addition, an optical waveguide combiner may be curved to achieve light emission in multiple directions without the use of multiple optical waveguide combiners.

Figure 5:
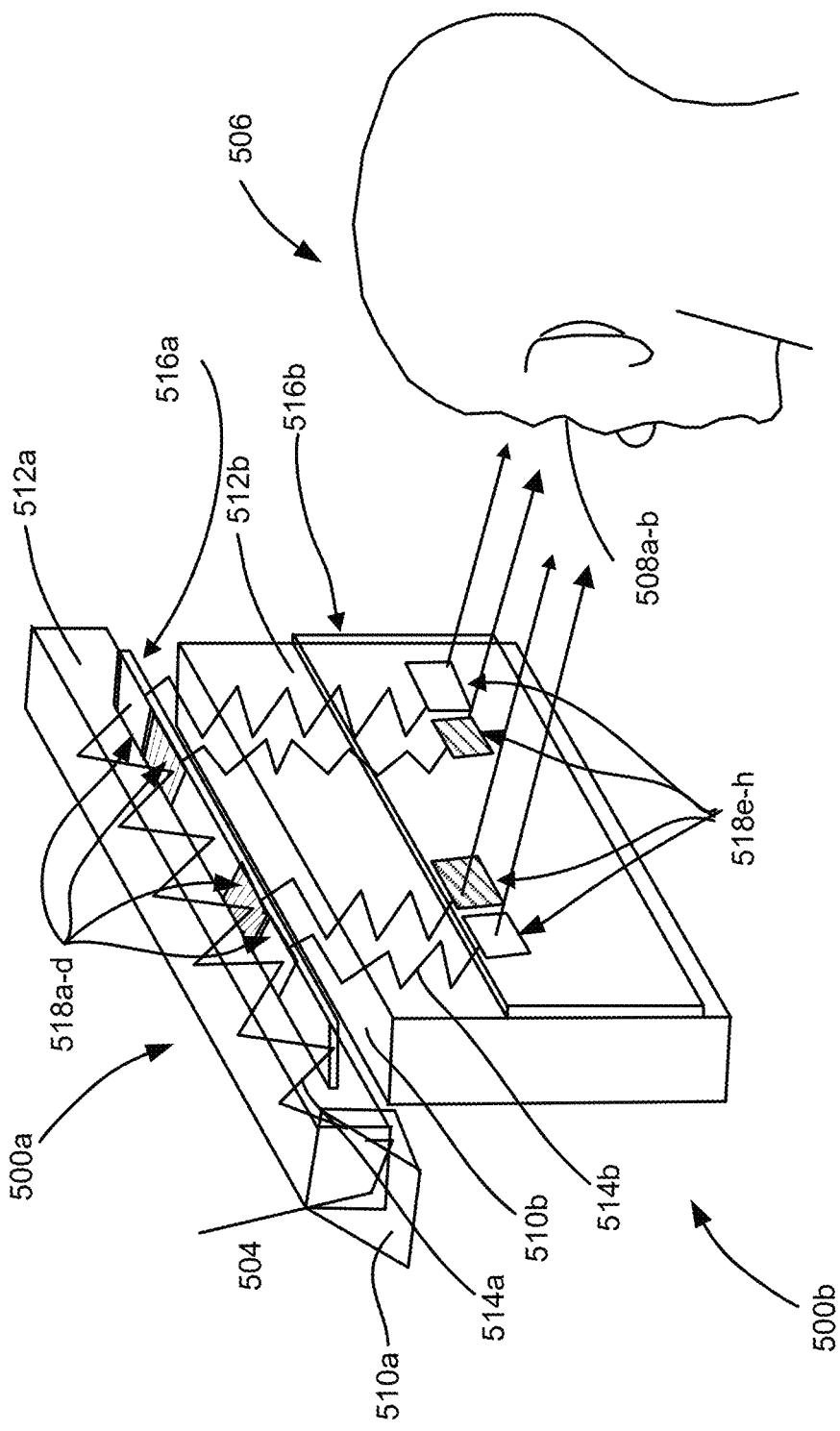
FIG. 5 illustrates another example of dynamic grating activation for two waveguide combiners for two-dimensional pupil relocation in accordance with an embodiment of the present disclosure.

FIG. 5 illustrates another example of dynamic grating activation for two optical waveguide combiners 500a-b for two-dimensional pupil relocation in accordance with an embodiment of the present disclosure. The optical waveguide combiner 500a includes a first optical element 510a, a substrate 512a, and a second optical element 516a. The first optical element 510a can receive light 504 emitted by a light source (e.g., light projector 110 in FIG. 1). As an example, the first optical element 510a may be an in-coupling holographic optical element. The substrate 512a can be transparent and propagate the light 504 received by the first optical element 510a along a propagation path 514a within the substrate 512a. The substrate 512a can include an input surface that is coupled to the first optical element 510a and an output surface that is coupled to the second optical element 516a.

In an example, the second optical element 516a can output the light 504 propagated along the propagation path 514a to the second optical waveguide combiner 500b. To output the light 504, the second optical element 516a can include diffraction gratings 518. The diffraction gratings 518 can be controllably activated based on a position of one or more pupils 508 in an eyebox 506. An eye tracking device (e.g., eye tracking device 116 in FIG. 1) can determine the position of the pupil 508 and a controller (e.g., controller 117 in FIG. 1) can activate the diffraction gratings that are associated with the position. For example, the diffraction grating 518a of the first waveguide combiner 500a may be activated based on a position of a first pupil 608a in the eyebox 506 and the diffraction grating 518d of the first waveguide combiner 500a may be activated based on a position of a second pupil 508b in the eyebox 506. Likewise, the diffraction grating 518e of the second waveguide combiner 500b may be activated based on a position of a first pupil 608a in the eyebox 506 and the diffraction grating 518*h* of the second waveguide combiner 500*b* may be activated based on a position of a second pupil 508*b* in the eyebox 506.

The second optical element 516*a* can redirect the light 504 in a first direction (e.g., the Y-direction in FIG. 5) and the diffraction gratings 518*a-d* of the second optical element 516*a* can be coupled to a third optical element 510*b* of the second optical waveguide combiner 500*b* along the first direction. As an example, the third optical element 510*b* may be an in-coupling holographic optical element. The second optical waveguide combiner 500*b* also includes a substrate 512*b* and a fourth optical element 516*b*. The substrate 512*b* can be transparent and propagate the light 504 received by the third optical element 510*b* along a propagation path 514*b* within the substrate 512*b*. The substrate 512*b* can include an input surface that is coupled to the third optical element 510*b* and an output surface that is coupled to the fourth optical element 516*b*.

In an example, the second optical element 516*a* can output the light 504 propagated along the propagation path 514*a* to a viewer. The fourth optical element 516*b* can redirect the light 504 in a second direction (e.g., the X-direction of FIG. 5). To output the light 504, the fourth optical element 516*b* can include diffraction gratings 518. The diffraction gratings 518 can be controllably activated based on the position of the pupil 508 in the eyebox 506. As illustrated, diffraction gratings 518*e-h* are activated based on the position of the pupils 508. Different voltages may be applied to the diffraction gratings 518*e-h* to achieve different diffraction efficiencies for the diffraction gratings 518*e-h*. Or, so that an entirety of the light 504 is output to the viewer, a same voltage may be applied to each of the diffraction gratings 518*e-h* to achieve a diffraction efficiency of 100%.

In addition to activating the diffraction gratings 518 that are associated with the positions of the pupils 508*a-b*, other diffraction gratings 518 may also be activated. These additionally activated gratings are shown in FIG. 5 by using dashed rectangles. For example, a diffraction grating that is adjacent to a diffraction grating corresponding (directly or indirectly) to the position of the pupil 508 may also be activated. As an example, the controller may determine that diffraction grating 518*a* and diffraction grating 518*d* of the first waveguide combiner 500*a* are to be activated based on the positions of the pupils 508*a-b*. The controller can then determine that diffraction grating 518*b* is adjacent to diffraction grating 518*a* and that diffraction grating 518*c* is adjacent to diffraction grating 518*d*. The controller can then additionally activate the diffraction gratings 518*b* and 518*c* by applying voltages thereto. Likewise, the controller may determine that diffraction grating 518*e* and diffraction grating 518*h* of the second waveguide combiner 500*b* are to be activated based on the positions of the pupils 508*a-b*. The controller can then determine that diffraction grating 518*f* is adjacent to diffraction grating 518*e* and that diffraction grating 518*g* is adjacent to diffraction grating h The controller can then additionally activate the diffraction gratings 518*f* and 518*g* by applying voltages thereto.

Different voltages may be applied to the diffraction gratings 518*a-d* to achieve different diffraction efficiencies for the diffraction gratings 518*a-d*. A diffraction grating that is positioned closer to the first optical element 510*a* may be activated to have a smaller diffraction efficiency than a diffraction grating that is further from the first optical element 510*a*. Further, a diffraction grating that is adjacent to another one corresponding to a pupil position may be activated to have a smaller diffraction efficient than the other one. For example, a first voltage may be applied to the diffraction grating 518*a* to achieve a diffraction efficiency of 25% for the diffraction grating 518*a*, a second voltage may be applied to the diffraction grating 518*b* to achieve a diffraction efficiency of 50% for the diffraction grating 518*b*, a third voltage may be applied to the diffraction grating 518*c* to achieve a diffraction efficiency of 75% for the diffraction grating 518*c*, and a fourth voltage may be applied to the diffraction grating 518*d* to achieve a diffraction efficiency of 100% for the diffraction grating 518*d*. So, 25% of the light 504 can be diffracted into the second optical waveguide combiner 500*b* by the diffraction grating 518*a*, 50% of the remaining light 504 can be diffracted into the second optical waveguide combiner 500*b* by the diffraction grating 518*b*, 75% of the remaining light 504 can then be diffracted into the second optical waveguide combiner 500*b* by the diffraction grating 518*c*, and then 100% of the remaining light 504 can be diffracted into the second optical waveguide combiner 500*b* by the diffraction grating 518*d*.

Although FIG. 5 illustrates two optical waveguide combiners being used to output light at ninety degrees with respect to each other, it is noted that the optical waveguide combiners may redirect light at different angles. In addition, an optical waveguide combiner may be curved to achieve light emission in multiple directions without the use of multiple optical waveguide combiners.

Figure 6:
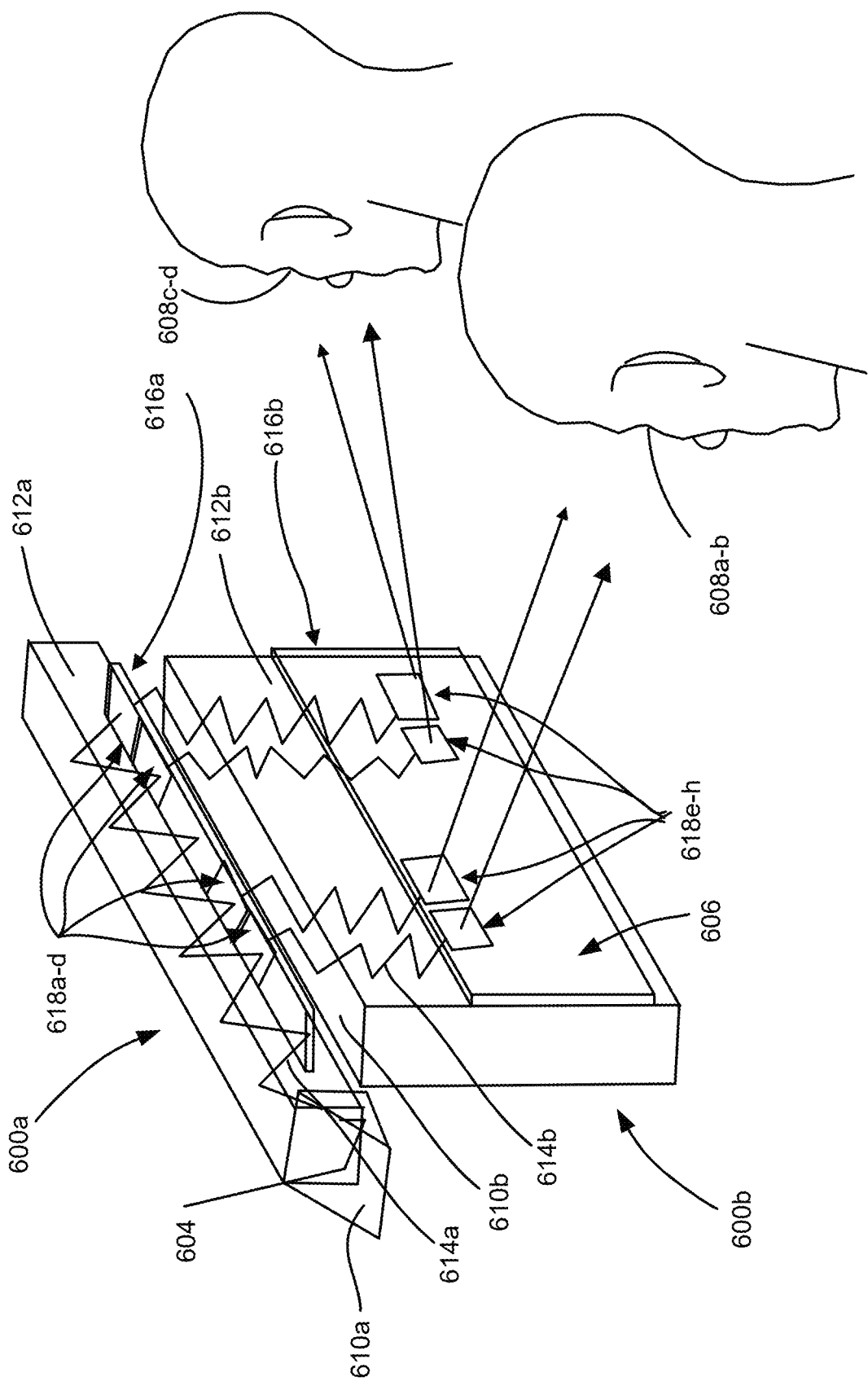
FIG. 6 illustrates another example of dynamic grating activation for two waveguide combiners for two-dimensional pupil relocation in accordance with an embodiment of the present disclosure.

FIG. 6 illustrates another example of dynamic grating activation for two optical waveguide combiners 600*a-b* for two-dimensional pupil relocation in accordance with an embodiment of the present disclosure. The optical waveguide combiner 600*a* includes a first optical element 610*a*, a substrate 612*a*, and a second optical element 616*a*. The first optical element 610*a* can receive light 604 emitted by a light source (e.g., light projector 110 in FIG. 1). As an example, the first optical element 610*a* may be an in-coupling holographic optical element. The substrate 612*a* can be transparent and propagate the light 604 received by the first optical element 610*a* along a propagation path 614*a* within the substrate 612*a*. The substrate 612*a* can include an input surface that is coupled to the first optical element 610*a* and an output surface that is coupled to the second optical element 616*a*.

In an example, the second optical element 616*a* can output the light 604 propagated along the propagation path 614*a* to the second optical waveguide combiner 600*b*. To output the light 604, the second optical element 616*a* can include diffraction gratings 618. The diffraction gratings 618 can be controllably activated based on a position of one or more pupils 608 in an eyebox 606. An eye tracking device (e.g., eye tracking device 116 in FIG. 1) can determine the position of the pupil 608 and a controller (e.g., controller 117 in FIG. 1) can activate the diffraction gratings 618*a-b* that are associated with the position. The diffraction grating 618*a* may be activated based on a position of a first pupil in the eyebox 606 and the diffraction grating 618*b* may be activated based on a position of a second pupil in the eyebox 606.

Multiple viewers may be positioned within the eyebox 606, and diffraction gratings 618 associated with the positions of each pupil of the viewers can be activated. For example, the controller may determine that diffraction gratings 618*a-b* correspond to the positions of the pupils 608*a-b* of a first viewer and diffraction gratings 618*c-d* correspond to the positions of the pupils 608*c-d* of a second viewer. The controller can activate the diffraction gratings 618*a-d* by applying voltages to the diffraction gratings 618*a-d*.

Different voltages may be applied to the diffraction gratings 618*a-d* to achieve different diffraction efficiencies for the diffraction gratings 618a-d. A diffraction grating that is positioned closer to the first optical element 610a may be activated to have a smaller diffraction efficiency than a diffraction grating that is further from the first optical element 610a. For example, a first voltage may be applied to the diffraction grating 618a to achieve a diffraction efficiency of 25% for the diffraction grating 618a, a second voltage may be applied to the diffraction grating 618b to achieve a diffraction efficiency of 50% for the diffraction grating 618b, a third voltage may be applied to the diffraction grating 618c to achieve a diffraction efficiency of 75% for the diffraction grating 618c, and a fourth voltage may be applied to the diffraction grating 618d to achieve a diffraction efficiency of 100% for the diffraction grating 618d. So, 25% of the light 604 can be diffracted into the second optical waveguide combiner 600b by the diffraction grating 618a, 50% of the remaining light 604 can be diffracted into the second optical waveguide combiner 600b by the diffraction grating 618b, 75% of the remaining light 604 can then be diffracted into the second optical waveguide combiner 600b by the diffraction grating 618c, and then 100% of the remaining light 604 can be diffracted into the second optical waveguide combiner 600b by the diffraction grating 618d.

The second optical element 616a can redirect the light 604 in a first direction (e.g., the Y-direction in FIG. 6) and the diffraction gratings 618a-d of the second optical element 616a can be coupled to a third optical element 610b of the second optical waveguide combiner 600b along the first direction. As an example, the third optical element 610b may be an in-coupling holographic optical element. The second optical waveguide combiner 500b also includes a substrate 612b and a fourth optical element 616b. The substrate 612b can be transparent and propagate the light 604 received by the third optical element 610b along a propagation path 614b within the substrate 612b. The substrate 612b can include an input surface that is coupled to the third optical element 610b and an output surface that is coupled to the fourth optical element 616b.

In an example, the second optical element 616a can output the light 604 propagated along the propagation path 614a to a viewer. The fourth optical element 616b can redirect the light 604 in a second direction (e.g., the X-direction in FIG. 6). To output the light 604, the fourth optical element 616b can include diffraction gratings 618. The diffraction gratings 618 can be controllably activated based on the position of the pupils 608 in the eyebox 606. As illustrated, diffraction gratings 618e-h are activated based on the position of the pupils 608. Different voltages may be applied to the diffraction gratings 618e-h to achieve different diffraction efficiencies for the diffraction gratings 618e-h. Or so that an entirety of the light 604 is output to the viewer, a same voltage may be applied to each of the diffraction gratings 618e-h to achieve a diffraction efficiency of 100%.

Although FIG. 6 illustrates two optical waveguide combiners being used to output light at ninety degrees with respect to each other, it is noted that the optical waveguide combiners may redirect light at different angles. In addition, an optical waveguide combiner may be curved to achieve light emission in multiple directions without the use of multiple optical waveguide combiners.

FIG. 7 illustrates an example of dynamic grating activation for a photonic switch waveguide combiner in accordance with an embodiment of the present disclosure. A waveguide combiner 700 may be a photonic switch and can include a first optical element 710 and diffraction gratings 718. The photonic switch can be a component of a fiber-optic switching device or an optical cross-connect device.

The first optical element 710 and each of the diffraction gratings 718 can be coupled to fiber optic cables. For instance, the first optical element 710 can be coupled to an input fiber optic cable 730, and each of the diffraction gratings 718a-d can be coupled to a corresponding output fiber optic cable 732a-d.

The first optical element 710 can receive light 704 emitted by a light source (e.g., light projector 110 in FIG. 1), where the light 704 (e.g., based on its wavelength, waveform, modulation, etc.) can encode data that is transmitted optically to a set of receivers each having a network address. As an example, the first optical element 710 may be an in-coupling holographic optical element. The waveguide combiner 700 can include a substrate that propagates the light 704 received by the first optical element 710 along a propagation path within the substrate. The first optical element 710 and the diffraction gratings 718 can be disposed on intersecting sides of the waveguide combiner 700 such that light received via the first optical element 710 can be propagated within the substrate for extraction out of the waveguide combiner 700 via at least one of the diffraction gratings 718.

In an example, the diffraction gratings 718 can be selectively controlled to output the light 704. Each of the diffraction gratings 718a-d can have a controllable diffraction efficiency. That is, the diffraction efficiency of diffraction grating 718a may be the same as or different from the diffraction efficiency(ies) of the diffraction gratings 718b-d. The diffraction efficiency of each of the diffraction gratings 718a-d may be controlled by a controller (e.g., controller 117 in FIG. 1) that applies voltage to the diffraction gratings 718a-d. The controller may receive data indicating a network address destination for the light 704. The controller can then determine which diffraction grating 718 corresponds to the network address destination. The controller can determine the diffraction grating based on a mapping between network address destinations and the diffraction gratings 718a-d. For example, the controller can determine that the diffraction grating 718a corresponds to the network address destination. The mapping can associate each network address (e.g., an internet protocol (IP) address with an identifier of a diffraction grating) and can be stored locally or accessible to the controller. As such, given the network address, the controller can look up the mapping to identify the diffraction grating that needs to be activated such that the light can be switched towards the network address.

The controller can apply a voltage to the diffraction grating 718a to activate the diffraction grating 718a by controlling a diffraction efficiency for the diffraction grating 718a. Upon activating the diffraction grating 718a, at least a portion of the light 704 can be output by the diffraction grating 718a to the output fiber optic cable 732a. That is, once the controller applies the voltage to activate the diffraction grating 718a, at least a portion of the light 704 can be output by the diffraction grating 718a. The other diffraction gratings can remain inactive and not output a portion of the light 704 into the output fiber optic cables 732b-d.

Figure 8:
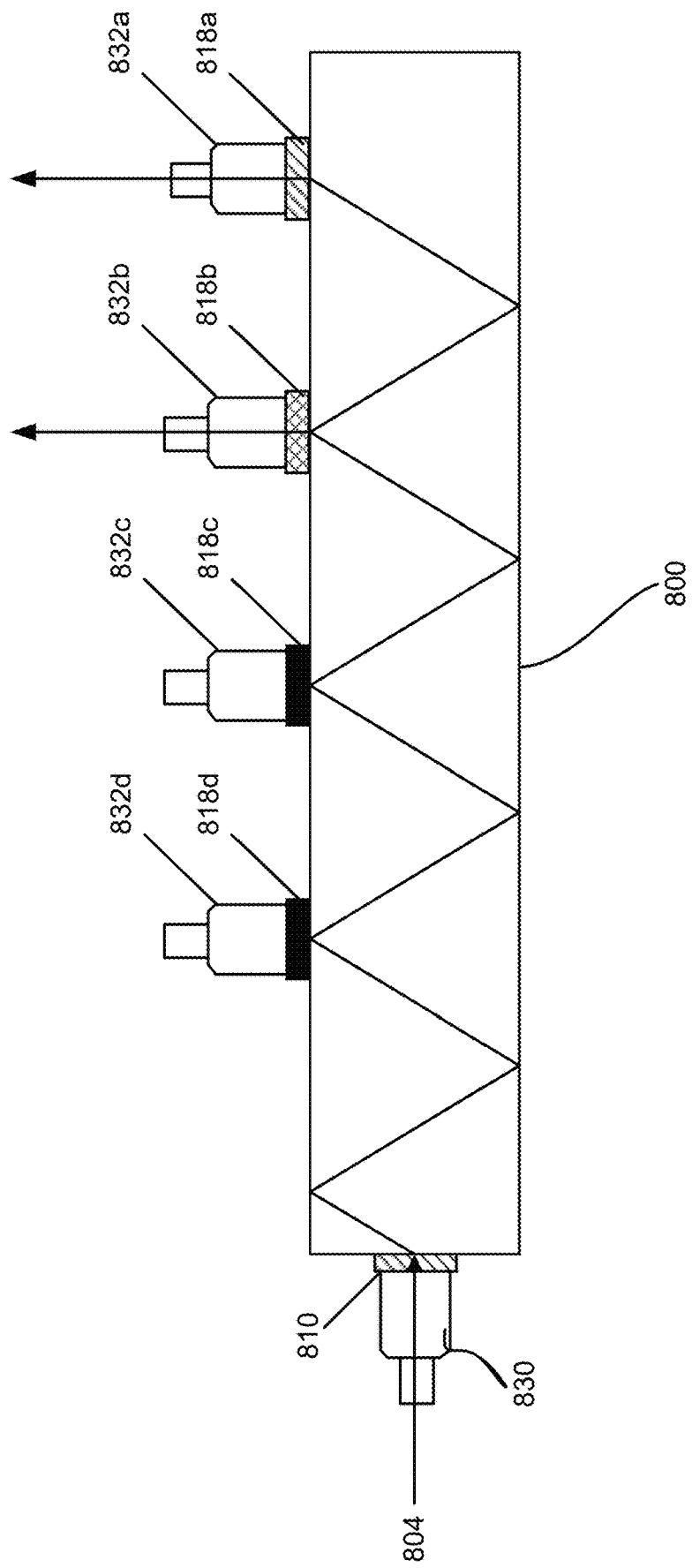
FIG. 8 illustrates another example of dynamic grating activation for a photonic switch waveguide combiner in accordance with an embodiment of the present disclosure.

FIG. 8 illustrates another example of dynamic grating activation for a photonic switch waveguide combiner in accordance with an embodiment of the present disclosure. Whereas FIG. 7 illustrates the activation of a single diffraction grating, a waveguide combiner 800 of FIG. 8 supports the activation of multiple diffraction grating such that light can be switched towards multiple receivers. In an example, the waveguide combiner 800 may be a photonic switch and can include a first optical element 810 and diffraction gratings 818. The photonic switch can be a component of a fiber-optic switching device or an optical cross-connect device. The first optical element 810 and each of the diffraction gratings 818 can be coupled to fiber optic cables. For instance, the first optical element can be coupled to an input fiber optic cable 830 can each of the diffraction gratings 818a-d can be coupled to a corresponding output fiber optic cable 832a-d. The first optical element 810 can receive light 804 emitted by a light source (e.g., light projector 110 in FIG. 1). As explained herein above, the light 804 can encode data to be sent to receivers. As an example, the first optical element 810 may be an in-coupling holographic optical element. The waveguide combiner 800 can include a substrate that propagates the light 804 received by the first optical element 810 along a propagation path within the substrate.

In an example, the diffraction gratings 818 can be selectively controlled to output the light 804. Each of the diffraction gratings 818a-d can have a controllable diffraction efficiency. That is, the diffraction efficiency of diffraction grating 818a may be the same as or different from the diffraction efficiency(ies) of the diffraction gratings 818b-d. The diffraction efficiency of each of the diffraction gratings 818a-d may be controlled by a controller (e.g., controller 117 in FIG. 1) that applies voltage to the diffraction gratings 818a-d. The controller may receive data indicating one or more network address destinations for the light 804. The controller can then determine that which diffraction grating(s) 818 corresponds to the network address destination(s). The controller can determine the diffraction grating(s) based on a mapping between network address destinations and the diffraction gratings 818a-d. For example, the data can indicate two network address destinations and the controller can determine that the diffraction grating 818a corresponds to a first network address destination (e.g., a first IP address of a receiver) and the diffraction grating 818b corresponds to a second network address destination (e.g., a second IP address of a receiver).

The controller can apply a voltage to the diffraction gratings 818a-b to activate the diffraction gratings 818a-b by controlling a diffraction efficiency for the diffraction gratings 818a-b. Upon activating the diffraction gratings 818a-b, at least a portion of the light 804 can be output by each of the diffraction gratings 818a-b to the output fiber optic cables 832a-b. That is, once the controller applies the voltage to activate the diffraction gratings 818a-b, at least a portion of the light 804 can be output by the diffraction gratings 818a-b. The other diffraction gratings can remain inactive and not output a portion of the light 804 into the output fiber optic cables 832c-d.

Different voltages may be applied to the diffraction gratings 818a-b to achieve different diffraction efficiencies for the diffraction gratings 818a-b. A diffraction grating that is positioned closer to the first optical element 810 may be activated to have a smaller diffraction efficiency than a diffraction grating that is further from the first optical element 810. Being positioned closer represents the fact that the light propagation path to the diffraction grating is relatively shorter than that to another diffraction grating. In other words, the light 804 propagates to the diffraction grating before propagating to the next one. A first voltage may be applied to the diffraction grating 818b to achieve a diffraction efficiency of 50% for the diffraction grating 818b and a second voltage may be applied to the diffraction grating 818a to achieve a diffraction efficiency of 100% for the diffraction grating 818a. So, 50% of the light 804 can be diffracted into the output fiber optic cable 832b by the diffraction grating 818b, then the remaining 50% of light 804 can be diffracted into the output fiber optic cable 832a by the diffraction grating 818a.

Figure 9:
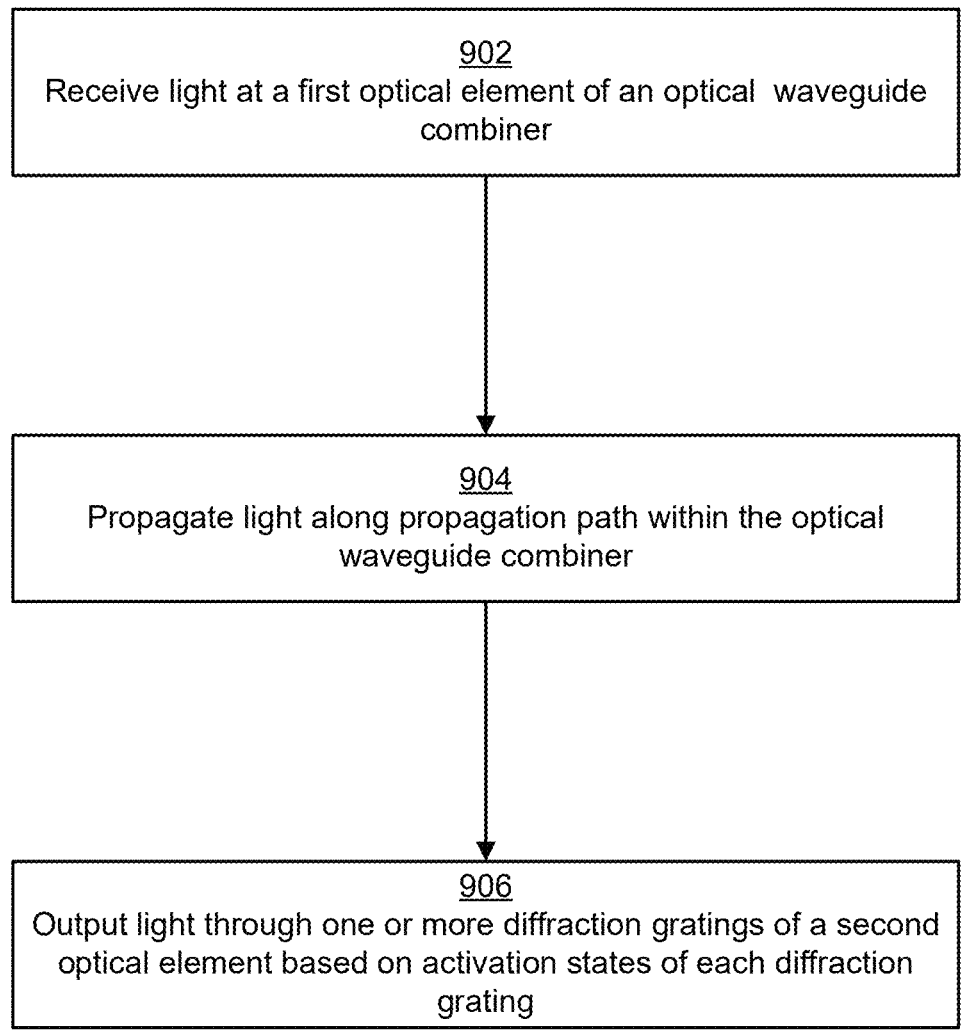
FIG. 9 illustrates an example of a flow for propagating light in an optical waveguide combiner in accordance with an embodiment of the present disclosure.

FIG. 9 illustrates an example of a flow for propagating light in an optical waveguide combiner in accordance with an embodiment of the present disclosure. An optical waveguide combiner (e.g., optical waveguide combiner 100 in FIG. 1) is described as performing the operations of the example flow. While the operations are illustrated in a particular order, it should be understood that no particular order.

In an example, the flow includes operation 902, where the optical waveguide combiner receives light at a first optical element. The first optical waveguide combiner can be a holographic optical element that is coupled to an input surface of a substrate. The light may be received from a light source that is part of a mixed reality system. The mixed reality system can also include an eye tracking device and a controller for controlling the optical waveguide combiner.

In an example, the flow includes operation 904, where the optical waveguide combiner propagates the light along a propagation path within the optical waveguide combiner. Upon receiving the light at the input surface of the substrate, the light can propagate along a propagation path within the substrate. The light may propagate within the substrate until the light reaches an activated portion of a second optical element that is coupled to an output surface of the substrate. The activated portion can be a diffraction grating of the second optical element to which a voltage is applied to control a diffraction efficiency of the diffraction grating. The second optical element can include multiple diffraction gratings that form an eyebox and each of the diffraction gratings can have a corresponding voltage-based controllable diffraction efficiency.

In an example, the flow includes operation 906, where the optical waveguide combiner outputs the light through one or more diffraction gratings of the second optical element based on activation states of each diffraction grating. Each diffraction grating can include a ground electrode coupled to a liquid crystal volume that is coupled to a polarizing electrode. The ground electrode can be coupled to a voltage ground and the polarizing electrodes can be coupled to a voltage source. A controller can control the voltage source to apply a voltage to diffraction gratings based on positions of one or more pupils in the eyebox. The controller can determine a pupil position from data received from an eye tracking device. Based on mapping data that associates different possible pupil positions in the eyebox with identifiers of diffraction gratings, the controller can identify the diffraction grating associated with the pupil position and activate the diffraction grating by applying a voltage to its polarizing electrode to achieve a target efficiency. This target efficiency can be about 100% if only one diffraction grating is to be activated. If more than diffraction grating is to be activated, the controller can determine the particular voltage to apply to each of the diffraction gratings based on the position of each of the diffraction gratings and the total number of diffraction gratings to be activated. The optical waveguide combiner may output the light to a second optical waveguide combiner that also has controllable diffraction gratings. The optical waveguide combiner can redirect the light in a first direction and the second optical waveguide combiner can output light in a second direction. The diffraction gratings of the optical waveguide combiner can be coupled with the second optical waveguide combiner along the first direction.

Figure 10:
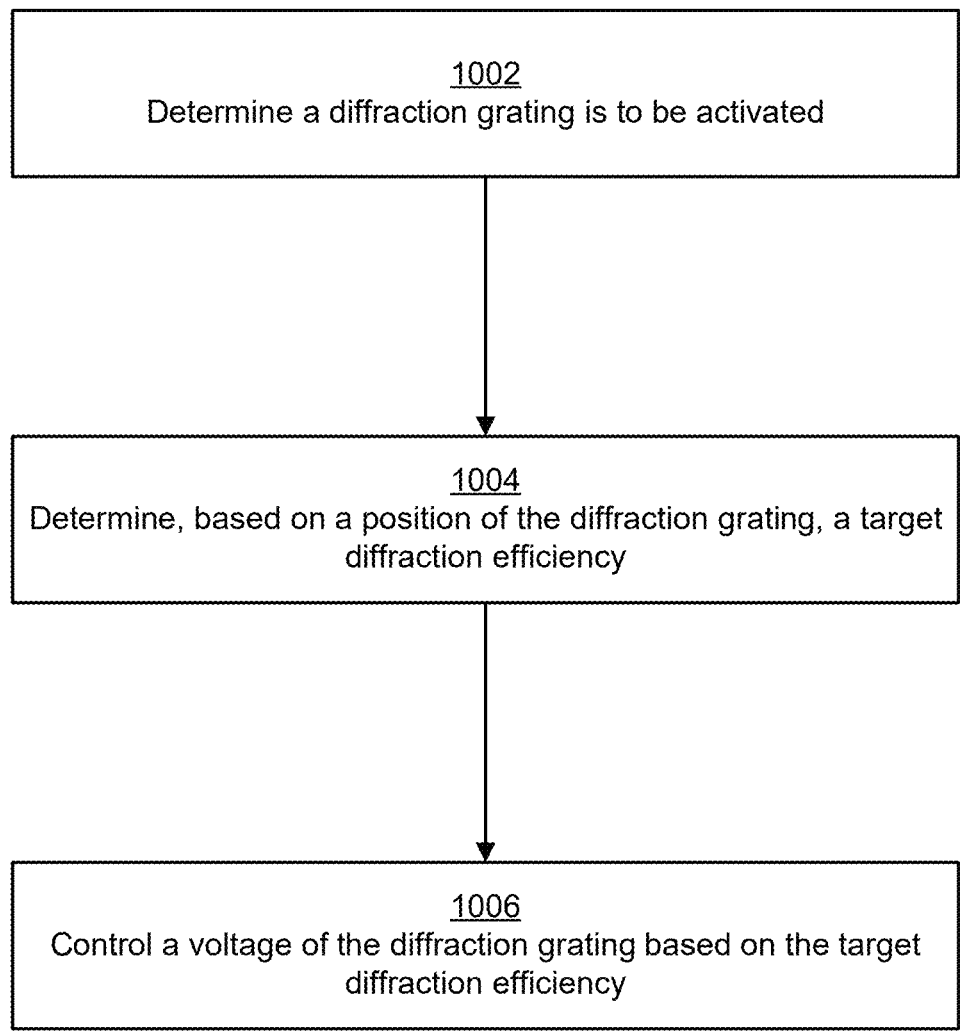
FIG. 10 illustrates an example of a flow for dynamic grating activation for a waveguide combiner in accordance with an embodiment of the present disclosure.

FIG. 10 illustrates an example of a flow for dynamic grating activation for a waveguide combiner in accordance with an embodiment of the present disclosure. A controller (e.g., controller 117 in FIG. 1) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor(s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order.

In an example, the flow includes operation 1002, where the controller determines a diffraction grating is to be activated. The controller can receive data indicating a position on an output surface of a substrate of a waveguide combiner. The controller can determine that a first diffraction gratings of multiple diffraction gratings of an optical element coupled to the output surface corresponds to the position. The output surface can be part of a substrate that also includes an input surface to which light is received from an input optical element. In the use case of a mixed reality system, the position on the output surface may be determined based on an eye tracking device determining a position of a pupil in an eyebox. The eye tracking device may detect positions of multiple pupils, so the data may indicate multiple positions on the output surface and each position can correspond to a different diffraction grating that is to be activated. In the use case of a photonics switch, the position corresponds to a fiber optic output associated with a network address.

In an example, the flow includes operation 1004, where the controller determines, based on a position of the diffraction grating, a target diffraction efficiency. If the data indicates only one diffraction grating is to be activated, the target diffraction efficiency may be 100%. If the data indicates multiple diffraction gratings are to be activated, the target diffraction efficiency may be different for each diffraction grating. A diffraction grating that is closer to the input optical element can have a smaller target diffraction efficiency than a diffraction grating that is further from the input optical element. In the use case of a mixed reality system, the target diffraction efficiencies can be determined so that the same amount of light is sent to each eye of the viewer. In the use case of a photonics switch, the target diffraction efficiencies can be determined so that the same amount of light is sent to each fiber optic output.

In an example, the flow includes operation 1006, where the controller controls a voltage of the diffraction grating based on the target diffraction efficiency. Different voltages may be applied to different diffraction gratings to achieve the different target diffraction efficiencies. Depending on the type of the materials used in the diffraction grating, a higher voltage may be associated with a higher diffraction efficiency (e.g., in the use case of liquid crystals).

Figure 11:
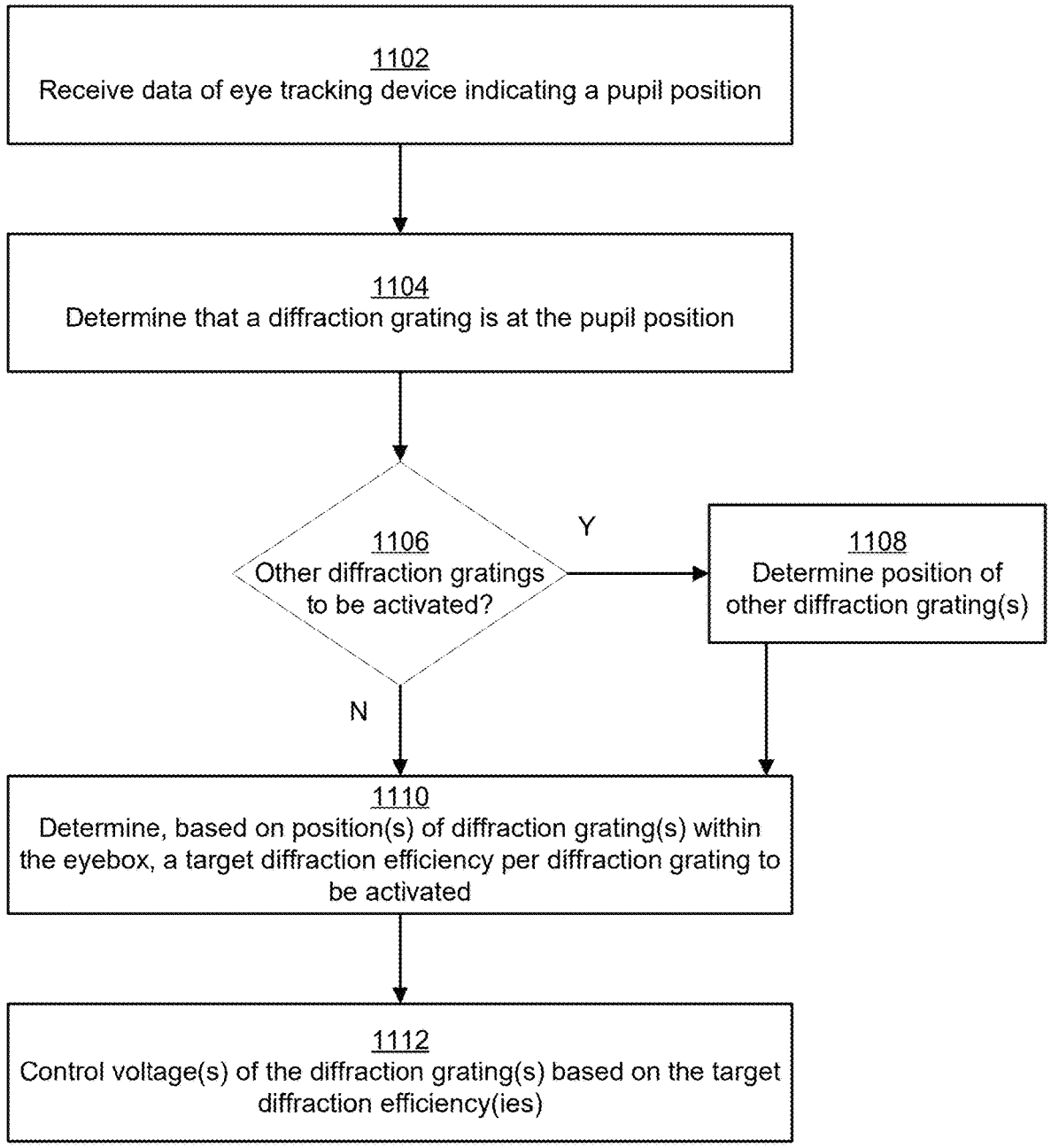
FIG. 11 illustrates an example of a flow for propagating light in an optical waveguide combiner of an image display system in accordance with an embodiment of the present disclosure.

FIG. 11 illustrates an example of a flow for propagating light in an optical waveguide combiner of an image display system in accordance with an embodiment of the present disclosure. A controller (e.g., controller 117 in FIG. 1) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor(s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order.

In an example, the flow includes operation 1102, where the controller receives data of an eye tracking device indicating a pupil position. The eye tracking device can monitor the pupil position with an image sensor and send the data continuously or periodically to the controller. The controller and the eye tracking device may be part of a mixed reality system.

In an example, the flow includes operation 1104, where the controller determines that a diffraction grating is at the pupil position. Each diffraction grating of an optical waveguide combiner can be mapped to a position in an eyebox. Accordingly, the controller can look up mapping data by using the pupil position indicated in the data and the mapping. The result of the look-up can include an identifier of the diffraction grating that is associated with the pupil position and that is to be activated.

In an example, the flow includes operation 1106, where the controller determines whether other diffraction gratings are to be activated. The controller can determine whether the data also indicates one or more additional positions of other pupils in the eyebox. For each additional pupil, the controller can determine a corresponding diffraction grating of the optical waveguide combiner that is to be activated. In some examples, the controller may determine a diffraction grating that is adjacent to the diffraction grating(s) that are to be activated and additionally determine that the adjacent diffraction gratings are to be activated. If other diffraction gratings are to be activated, the flow proceeds to operation 1108. Otherwise, the flow proceeds to operation 1110.

In an example, the flow includes operation 1108, where the controller determines position(s) of the other diffraction grating(s). The controller can determine the position(s) based on the data indicating the pupil position(s) and the mapping between the diffraction gratings and the pupil positions in the eyebox.

In an example, the flow includes operation 1110, where the controller determines, based on the position(s) of the diffraction grating(s) within the eyebox, a target diffraction efficiency per diffraction grating to be activated. If the data indicates only one diffraction grating is to be activated, the target diffraction efficiency may be 100%. If the data indicates multiple diffraction gratings are to be activated, the target diffraction efficiency may be different for each diffraction grating. A diffraction grating that is closer to the input optical element can have a smaller target diffraction efficiency than a diffraction grating that is further from the input optical element. The target diffraction efficiencies can be determined so that the same amount of light is sent to each eye of the viewer.

In an example, the flow includes operation 1112, where the controller controls voltage(s) of the diffraction grating(s) based on the target diffraction efficiency(ies). Different voltages may be applied to different diffraction gratings to achieve the different target diffraction efficiencies. A higher voltage may be associated with a higher diffraction efficiency.

Figure 12:
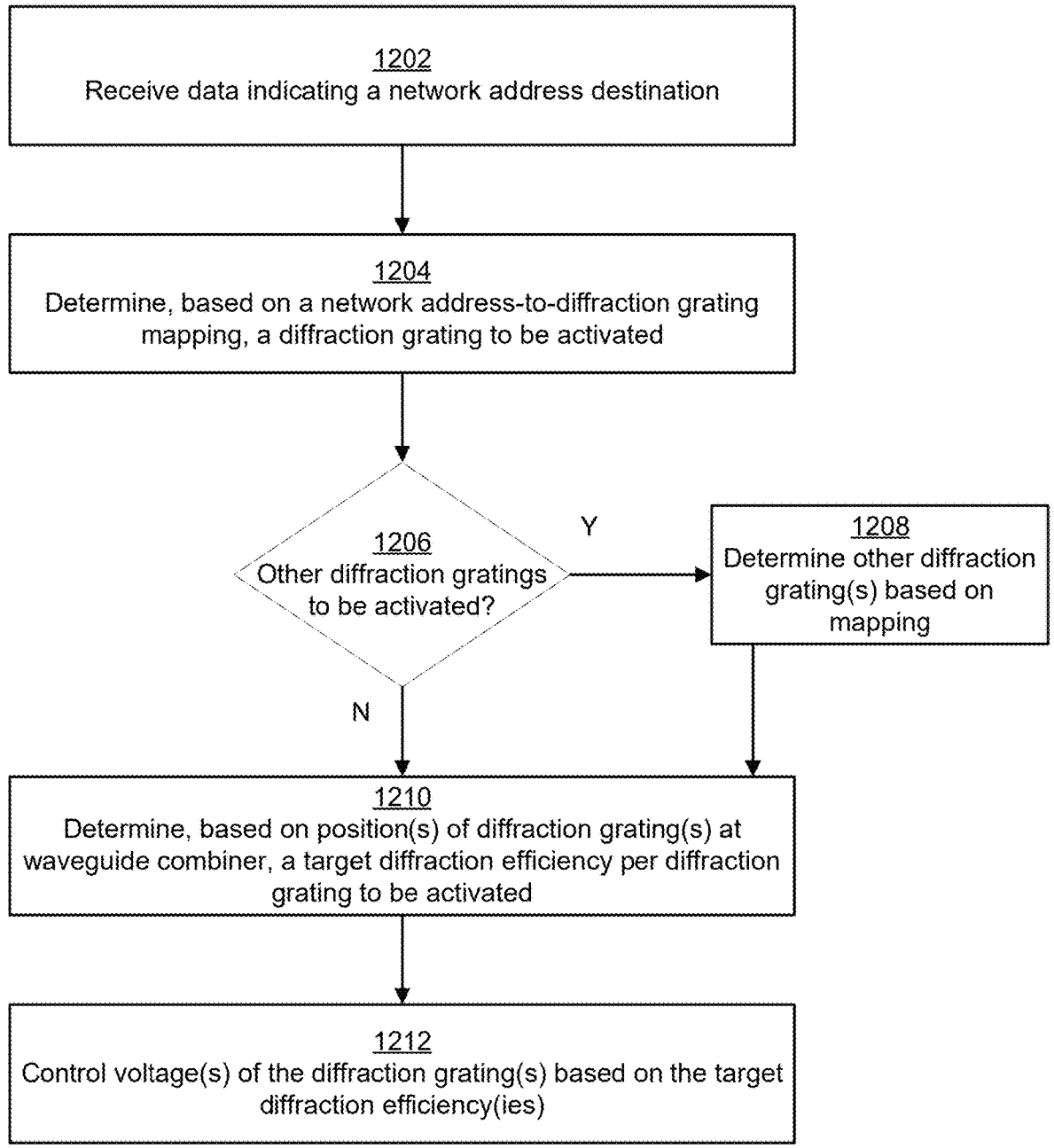
FIG. 12 illustrates an example of a flow for propagating light in an optical waveguide combiner of a photonic switch in accordance with an embodiment of the present disclosure.

FIG. 12 illustrates an example of a flow for propagating light in an optical waveguide combiner of a photonic switch in accordance with an embodiment of the present disclosure.

A controller (e.g., controller 117 in FIG. 1) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor(s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order.

In an example, the flow includes operation 1202, where the controller receives data indicating a network address destination. The controller can be in communication with a waveguide combiner that is implemented in a photonics switch. The network address destination can be for a receiver to receive data that the light encodes.

In an example, the flow includes operation 1204, where the controller determines, based on a network address-to-diffraction grating mapping, that a diffraction grating is to be activated. Each diffraction grating of the optical waveguide combiner can be mapped to a network address. The controller can store the network address-to-diffraction grating mapping, where this mapping associates each network address with an identifier of a diffraction grating. Accordingly, the controller uses the network address in a look-up of the network address-to-diffraction mapping. The result of the look-up can include the identifier of the diffraction grating.

In an example, the flow includes operation 1206, where the controller determines whether other diffraction gratings are to be activated. The controller can determine whether the data also indicates one or more additional network address destinations. For each additional network address destination, the controller can determine, based on the network address-to-diffraction grating mapping, a corresponding diffraction grating of the optical waveguide combiner that is to be activated. If other diffraction gratings are to be activated, the flow proceeds to operation 1208. Otherwise, the flow proceeds to operation 1210.

In an example, the flow includes operation 1208, where the controller determines position(s) of the other diffraction grating(s). The controller can determine the position(s) based on the data indicating the network address destinations and the network address-to-diffraction grating mapping.

In an example, the flow includes operation 1210, where the controller determines, based on the position(s) of the diffraction grating(s) at the optical waveguide combiner, a target diffraction efficiency per diffraction grating to be activated. If the data indicates only one diffraction grating is to be activated, the target diffraction efficiency may be 100%. If the data indicates multiple diffraction gratings are to be activated, the target diffraction efficiency may be different for each diffraction grating. A diffraction grating that is closer to an input optical element of the optical waveguide combiner can have a smaller target diffraction efficiency than a diffraction grating that is further from the input optical element. The target diffraction efficiencies can be determined so that the same amount of light is sent out via the activated diffraction gratings.

In an example, the flow includes operation 1212, where the controller controls voltage(s) of the diffraction grating(s) based on the target diffraction efficiency(ies). Different voltages may be applied to different diffraction gratings to achieve the different target diffraction efficiencies. A higher voltage may be associated with a higher diffraction efficiency.

Figure 13:
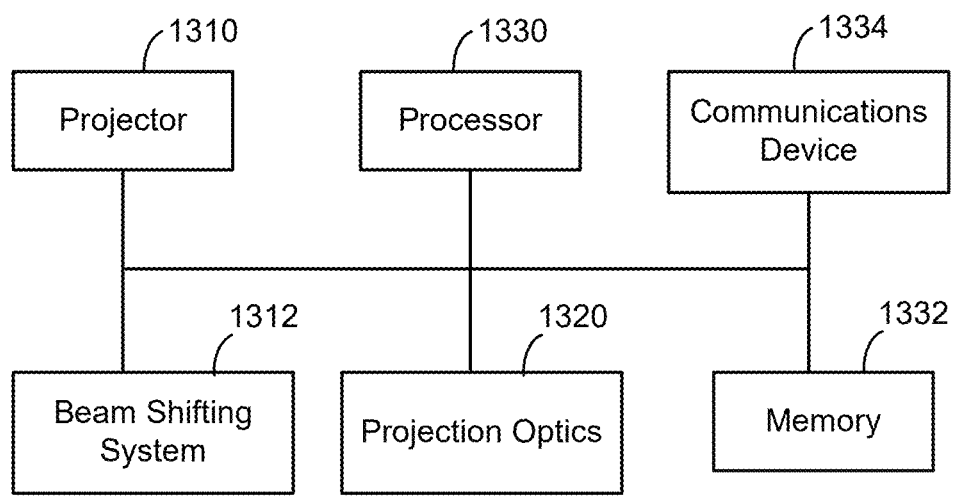
FIG. 13 illustrates a schematic diagram of an image system in accordance with an embodiment of the present disclosure.

FIG. 13 illustrates a schematic diagram of a system 1300 system in accordance with an embodiment of the present disclosure. As illustrated in FIG. 13, the system 1300 supports a mixed reality system or a photonics switch. In an example, the system 1300 includes a projector 1310, which can be implemented as discussed in relation to light projector 110 in FIG. 1, and a beam shifting system 1312. In some embodiments, beam shifting system 1312 is integrated as an element of projector 1310, whereas in other embodiments, for example, when integrated with an eye-tracking system, beam shifting system 1312 can be implemented as a separate optical element. The system 1300 can also include projection optics 1320 operable to direct light produced using projector 1310 and/or beam shifting system 1312.

The system 1300 additionally includes processor 1330 (e.g., a microprocessor), memory 1332, and communications device 1334. Memory 1332, also referred to as storage media, stores computer-readable instructions of an application, where the computer-readable instructions are executable by processor 1330 to run the application. Additional description related to these elements is provided more fully below.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   an eye tracking device;
   a light projector;
   an optical waveguide combiner comprising:
      a first optical element configured to receive light emitted by the light projector;
      a substrate configured to propagate the light received by the first optical element along a propagation path within the substrate, the substrate comprising an input surface and an output surface, the input surface coupled to the first optical element; and a second optical element coupled to the output surface and configured to output the light propagated along the propagation path, the second optical element comprising a plurality of diffraction gratings that form an eyebox at the output surface, each one of the plurality of diffraction gratings having a corresponding controllable diffraction efficiency; and a controller configured to:

receive first data generated by the eye tracking device, the first data indicating a first pupil position within the eyebox where a viewer is looking;

determine that a first diffraction grating of the plurality of diffraction gratings corresponds to the first pupil position;

determine a first voltage to apply to the first diffraction grating, wherein the first voltage is determined based at least in part on a the first diffraction grating being positioned along the propagation path at a first grating position that is closer to the first optical element than a second grating position of a second diffraction grating of the plurality of diffraction gratings and based further on a total number of multiple diffraction gratings to be activated for the eyebox at a same time;

activate the first diffraction grating by at least controlling a first diffraction efficiency of the first diffraction grating according to the first voltage applied to the first diffraction grating;

determine a second voltage to apply to the second diffraction grating, wherein the second voltage is determined based at least in part on the second grating position of the second diffraction grating being further from the first optical element than the first grating position of the first diffraction grating, the second voltage being higher than the first voltage; and activate, while the first diffraction grating is activated, the second diffraction grating by at least controlling a second diffraction efficiency of the second diffraction grating according to the second voltage, wherein the first diffraction efficiency is smaller than the second diffraction efficiency, wherein a first portion of the light is output by the first diffraction grating upon the first diffraction grating being activated, wherein a second portion of the light is output by the second diffraction grating upon the second diffraction grating being activated, and wherein the first portion and the second portion are output concurrently.

2. The system of claim 1, wherein the optical waveguide combiner further comprises:

a ground electrode;

a cell coupled to the ground electrode and including liquid crystal molecules dispersed in a polymer;

a first polarizing electrode coupled to a first portion of the cell; and a second polarizing electrode separate from the first polarizing electrode and coupled to a second portion of the cell, wherein the first diffraction grating comprises a first portion of the ground electrode, the first portion of the cell, and the first polarizing electrode, and wherein the second diffraction grating comprises a second portion of the ground electrode, the second portion of the cell, and the second polarizing electrode.

3. The system of claim 1, wherein the eyebox is a first eyebox corresponding to a first viewer eye, and wherein the second diffraction grating corresponds to a second pupil position within a second eyebox, and wherein the second eyebox corresponds to a second viewer eye.

4. An apparatus comprising:

a first optical element configured to receive light;

a first substrate comprising an input surface and an output surface and configured to propagate the light received by the first optical element along a propagation path within the first substrate, the input surface coupled to the first optical element; and a second optical element coupled to the output surface, configured to output the light propagated along the propagation path, and comprising a plurality of diffraction gratings at the output surface, each one of the plurality of diffraction gratings having a corresponding controllable diffraction efficiency, wherein:

the plurality of diffraction gratings includes a first diffraction grating at a first position along the propagation path and a second diffraction grating at a second position along the propagation path, the first diffraction grating has a first diffraction efficiency controllable based at least in part on a first voltage such that only a first portion of the light is output at the first position, the first voltage is based at least in part on the first position being closer to the first optical element than the second position of the second diffraction grating and based further on a total number of multiple diffraction gratings to be activated for an eyebox at a same time, the second diffraction grating has a second diffraction efficiency controllable based at least in part on a second voltage such that a second portion of the light is output at the second position concurrently with the first portion of the light being output by the first diffraction grating, the first position is different than the second position, and the second voltage is different from the first voltage.

5. The apparatus of claim 4 further comprising:

a controller configured to:

receive first data indicating a position on the output surface;

determine that the first diffraction grating corresponds to the position; and activate the first diffraction grating by at least controlling the first diffraction efficiency of the first diffraction grating according to the first voltage applied to the first diffraction grating, wherein the first portion of the light is output by the first diffraction grating upon the first diffraction grating being activated.

6. The apparatus of claim 4, wherein the first diffraction grating comprises:

a first portion of a first electrically conductive layer coupled to a voltage ground;

a first portion of a cell coupled to the first electrically conductive layer and including liquid crystal molecules; and a second electrically conductive layer coupled to the first portion of the cell and to a voltage source, and wherein the second diffraction grating comprises:
a second portion of the first electrically conductive layer;
a second portion of the cell; and
a third electrically conductive layer separate from the second electrically conductive layer and coupled to the second portion of the cell and to the voltage source.

7. The apparatus of claim 4, wherein the first diffraction grating comprises:
a first electrically conductive layer coupled to a voltage ground;
a first cell coupled to the first electrically conductive layer and including first liquid crystal molecules; and
a second electrically conductive layer coupled to the first cell and to a voltage source, and
wherein the second diffraction grating comprises:
a third electrically conductive layer separate from the first electrically conductive layer and coupled to the voltage ground;
a second cell separate from the first cell, coupled to the third electrically conductive layer, and including second liquid crystal molecules; and
a fourth electrically conductive layer separate from the second electrically conductive layer and coupled to the second cell and to the voltage source.

8. The apparatus of claim 4 further comprising:
a first optical waveguide combiner that comprises the first optical element, the first substrate, and the second optical element, and wherein the plurality of diffraction gratings is a first plurality of diffraction gratings; and
a second optical waveguide combiner that is coupled to the first optical waveguide combiner and that comprises:
a third optical element coupled with the second optical element and configured to receive the light emitted by the second optical element;
a second substrate coupled to the third optical element and configured to propagate the light received by the third optical element; and
a fourth optical element coupled to the second substrate and configured to output the light propagated by the second substrate, the fourth optical element comprising a second plurality of diffraction gratings each of which having a corresponding controllable diffraction efficiency.

9. The apparatus of claim 8, wherein the second optical element of the first optical waveguide combiner is configured to emit the light in a first direction, wherein the fourth optical element of the second optical waveguide combiner is configured to emit the light in a second direction, and wherein the first plurality of diffraction gratings are coupled with the third optical element along the first direction.

10. The apparatus of claim 4, wherein the plurality of diffraction gratings corresponds to the eyebox at the output surface, and wherein the apparatus further comprises a controller configured to:
receive data indicating a pupil position within the eyebox;
determine that the first diffraction grating corresponds to the pupil position; and
activate the first diffraction grating by at least controlling the first diffraction efficiency of the first diffraction grating according to the first voltage applied to the first diffraction grating,
wherein the first portion of the light is output by the first diffraction grating upon the first diffraction grating being activated.

11. The apparatus of claim 4, wherein the apparatus further comprises a controller configured to:
receive data indicating a network address destination;
determine, based at least in part on a mapping between network address destinations and the plurality of diffraction gratings, that the first diffraction grating is to be activated; and
activate the first diffraction grating by at least controlling the first diffraction efficiency of the first diffraction grating according to the first voltage applied to the first diffraction grating,
wherein only the first portion of the light is output by the first diffraction grating upon the first diffraction grating being activated.

12. A method comprising:
receiving, by a controller, first data indicating that a first diffraction grating and a second diffraction grating of an apparatus are to be activated, the apparatus comprising:
a first optical element configured to receive light;
a substrate comprising an input surface and an output surface and configured to propagate the light received by the first optical element along a propagation path within the substrate, the input surface coupled to the first optical element; and
a second optical element coupled to the output surface, configured to output the light propagated along the propagation path, and comprising a plurality of diffraction gratings at the output surface, each one of the plurality of diffraction gratings having a corresponding controllable diffraction efficiency, wherein the first diffraction grating is positioned at a first position along the propagation path, and wherein the second diffraction grating is positioned at a second position along the propagation path different from the first position;
determining, by the controller, a first voltage to apply to the first diffraction grating based at least in part on the first position being closer to the first optical element than the second position of the second diffraction grating and based further and on a total number of multiple diffraction gratings to be activated for an eyebox at a same time;
determining, by the controller, a second voltage to apply to the second diffraction grating based at least in part on the second position being further away from to the first optical element than the first position of the first diffraction grating, the second voltage being different from the first voltage; and
activating, by the controller, the first diffraction grating and the second diffraction grating by at least controlling a first diffraction efficiency of the first diffraction grating according to the first voltage applied to the first diffraction grating and by at least controlling a second diffraction efficiency of the second diffraction grating according to the second voltage applied to the second diffraction grating, wherein only a first portion of the light is output at the first position upon the first diffraction grating being activated, and wherein a second portion of the light is output at the second position concurrently with the first portion being output upon the second diffraction grating being activated.

13. The method of claim 12, wherein the first data is generated by an eye tracking device and indicates a first pupil position within the eyebox, wherein the plurality of diffraction gratings form the eyebox, and wherein the method further comprises:

determining, by the controller, that the first diffraction grating corresponds to the first pupil position within the eyebox.

14. The method of claim 13 further comprising:
determining, by the controller, that the second diffraction grating of the plurality of diffraction gratings is adjacent to the first diffraction grating; and
activating, by the controller, the second diffraction grating by at least controlling the second diffraction efficiency of the second diffraction grating according to the second voltage applied to the second diffraction grating.

15. The method of claim 13 further comprising:
determining, by the controller, that the second diffraction grating of the plurality of diffraction gratings corresponds to a second pupil position within the eyebox, wherein the second pupil position is indicated by the first data; and
activating, by the controller, the second diffraction grating by at least controlling the second diffraction efficiency of the second diffraction grating according to the second voltage applied to the second diffraction grating.

16. The method of claim 13 further comprising:
receiving, by the controller, second data that is generated by the eye tracking device and that indicates a second pupil position within the eyebox, wherein the first data and the second data are received at different times;
determining, by the controller, that the second diffraction grating of the plurality of diffraction gratings corresponds to the second pupil position;
de-activating the first diffraction grating by at least causing the first voltage to no longer be applied to the first diffraction grating; and
activating, by the controller, the second diffraction grating by at least controlling the second diffraction efficiency of the second diffraction grating.

17. The method of claim 12 further comprising:
activating, by the controller, the second diffraction grating of the plurality of diffraction gratings by at least controlling the second diffraction efficiency of the second diffraction grating according to the second voltage applied to the second diffraction grating, wherein the second voltage is different from the first voltage.

18. The method of claim 12 further comprising:
determining, by the controller, that the second diffraction grating of the plurality of diffraction gratings is to be activated; and
determining, by the controller, the first position of the first diffraction grating and the second position of the second diffraction grating along the propagation path, wherein the first diffraction efficiency is based at least in part on the first position, and wherein the second diffraction efficiency is based on the second position.

19. The method of claim 12 further comprising:
receiving, by the controller, data indicating a first network address destination; and
determining, by the controller based at least in part on a mapping between network address destinations and the plurality of diffraction gratings, that the first diffraction grating corresponds to the first network address destination.

20. The method of claim 19 further comprising:
determining, by the controller based at least in part on the data, a second network address destination; and
determining, by the controller based at least in part on the mapping, that the second diffraction grating of the plurality of diffracting gratings corresponds to the second network address destination, wherein the second voltage is different from the first voltage.

* * * * *